United States Patent
Fu

(10) Patent No.: US 6,775,158 B2
(45) Date of Patent: Aug. 10, 2004

(54) PULSE WIDTH MODULATION CONTROLLER AND METHOD

(75) Inventor: Hongdan Fu, Cupertino, CA (US)

(73) Assignees: Sodick Co. Ltd., Yokohama (JP); Sodick America Corporation, San Jose, CA (US)

(*) Notice: Subject to any disclaimer, the term of this patent is extended or adjusted under 35 U.S.C. 154(b) by 0 days.

(21) Appl. No.: 10/244,025

(22) Filed: Sep. 16, 2002

(65) Prior Publication Data

US 2004/0052096 A1 Mar. 18, 2004

(51) Int. Cl.[7] .................................................. H02M 1/12
(52) U.S. Cl. ......................................................... 363/41
(58) Field of Search .............................. 363/40, 41, 43, 363/55, 56.01, 56.02, 97, 98, 131, 132

(56) References Cited

U.S. PATENT DOCUMENTS

| | | | | |
|---|---|---|---|---|
| 5,764,024 A | * | 6/1998 | Wilson | ........................ 318/805 |
| 5,930,132 A | * | 7/1999 | Watanabe et al. | ........ 363/56.04 |
| 5,973,527 A | * | 10/1999 | Schweighofer et al. | ..... 327/172 |
| 5,977,741 A | | 11/1999 | DeLange et al. | |
| 6,118,336 A | * | 9/2000 | Pullen et al. | .................. 330/10 |
| 6,535,402 B1 | * | 3/2003 | Ying et al. | ..................... 363/41 |

* cited by examiner

*Primary Examiner*—Matthew V. Nguyen
(74) *Attorney, Agent, or Firm*—McDermott Will & Emery LLP

(57) ABSTRACT

A PWM controller for an inverter includes a feedback circuit and a deadtime circuit for masking out of synchronization conditions which occur when the deadtime duration between switching the polarities of the desired output AC waveform is nearly equal to or longer than the duration of its PWM source waveform. The PWM controller for an inverter also includes a carrier range regulation circuit for reducing loss of the PWM duty cycle to prevent compromising the frequency spectrum of the desired AC waveform without requiring complicated software or additional CPU or DSP processing time.

27 Claims, 23 Drawing Sheets

PULSE WIDTH MODULATION CONTROLLER AND METHOD

FIELD OF THE INVENTION

The field of the present invention relates generally to inverters. More particularly, the invention relates to a pulse width modulation controller for inverters.

BACKGROUND INFORMATION

Inverter drivers are commonly used to control AC induction motors. Inverters create variable AC waveforms from a direct current (DC) source to drive AC induction motors. The Pulse Width Modulation ("PWM") control technique is the standard technique used to create the desired frequency and voltage of the AC waveforms.

FIG. 1 is a block diagram of a prior art controller for a DC to AC inverter using the standard PWM technique. As shown in FIG. 1, a signal generator 110 is electrically coupled to a controller unit 100. The controller unit 100 in turn drives the inverter 190. The signal generator 110 provides the controller unit 100 with two sources of signals, a sinusoidal signal ("PWMDATA") 101 and a high frequency triangular carrier signal ("CARRIER CNT") 102, which are used to shape the amplitude and frequency of the desired AC waveform.

Controller unit 100 includes a PWM Pulse Generator 113 and a top-bottom output controller 118. Included in the PWM Pulse Generator 113 is a comparator 114 which compares the PWMDATA signal 101 with the CARRIER CNT signal 102 and generates a resulting output variable square wave signal PWM OUT 119. When the PWMDATA 101 is higher in amplitude than the CARRIER CNT 102, the amplitude of the PWM OUT 119 will be high; similarly, when the PWMDATA 101 is lower in amplitude than the CARRIER CNT 102, the PWM OUT 119 will have an amplitude that is low.

In using PWM technique, two PWM signals are required to synthesize the two polarities of the AC waveform. Thus, the PWM OUT 119 signal and its complement signal (/PWM OUT 120) are separately fed through two separate AND gates 126, 128 within the top bottom output controller 118. Additionally, the PWM OUT 119 will pass through a first delay 122 as PWM DLY before reaching one of two inputs to the first AND gate 126 while the same PWM OUT 119 signal is passed through to the other input of the first AND gate 126. The resulting output of AND gate 126 is signal PWM TOP 127. Similarly, the complement signal /PWM OUT 120 will pass through a second delay 124 as /PWM DLY before reaching one of two inputs to the second AND gate 128 while the same /PWM OUT 120 signal is passed through to the other input of the second AND gate 128. The resulting output of AND gate 128 is signal PWM BOTTOM 129. PWM TOP 127 and PWM BOTTOM 129 are the two input signals to inverter 190. PWM TOP 127 and PWM BOTTOM 129 will drive separate gate drives 132, 133 inside the inverter 190 which with additional hardware (not shown and not germane to the present invention) will result in the generation of a desired AC waveform.

Typical DC to AC inverters (such as inverter 190) require a "dead" period (deadtime 130) between turning off one switch (such as a transistor switch) and turning on the other switch to ensure that the two switches (i.e., top switch 134 and bottom switch 136 shown in FIG. 1) do not conduct simultaneously which could damage the load. The required deadtime 130 is achieved by adding delay periods to the rising edges of the PWM OUT 119 and /PWM OUT 120 signals via passing these signals through the first and second delays 122, 124.

By adding the necessary delays to avoid having multiple switches conduct simultaneously and risking damages to the load, other problems are created. FIG. 2 shows the relative phase of the signals PWM OUT 119 and PWM TOP 127 in a normal condition, i.e., when the deadline 130 is shorter in duration than the duration of the PWM OUT 119. Here, in this normal condition, the two signals PWM OUT 119 and PWM TOP 127 are synchronized with each other. But, as shown in FIG. 3, when the deadtime 130 is longer in duration than PWM OUT 119, the PWM OUT 119 signal is out of synchronization with PWM TOP 127 signal. This condition can cause damages to the load (such as the inverter 190) because the PWM OUT 119 and PWM TOP 127 signals which control the gate drive to switch 134 are out of synchronization with each other. A similar out of synchronization condition can result between /PWM OUT 120 and PWM BOTTOM 129 with damaging effects to the load if the deadtime duration is longer the /PWM OUT 120. As such, it would be desirable to provide a solution in the form of a PWM protection circuit (within the PWM controller) for masking the out of synchronization condition.

A second problem with the prior art controller circuit results when the absolute value of the PWMDATA 101 amplitude is outside the maximum or minimum amplitude range (±MaxCount) of the high frequency triangular carrier signal CARRIER CNT 102 as seen from time period t5 through t8 in FIG. 4. When the PWMDATA 101 is out of the ±MaxCount range of the CARRIER CNT 102 signal, the comparator 114 makes an incorrect comparison and generates an inappropriate PWM OUT 119 (and hence is also unable to achieve a complement signal, /PWM OUT 120, appropriately). This results in a loss of the PWM duty cycle, resulting in a perturbation to the frequency spectrum of the desired AC waveform. A prior art solution to this second problem is to use a software comparison algorithm to compare the PWM DATA 101 with the ±MaxCount range of the CARRIER CNT 102 signal. However, this software adds complexity and may require too much CPU or DSP processing time. Accordingly, it would be desirable to provide a solution which would not require complicated software or additional CPU/DSP processing time.

SUMMARY OF THE INVENTION

The present invention is directed to protection circuitry for pulse width modulation control of inverters. The present invention overcomes the problem of PWM duty cycle loss of the prior art by incorporating a Carrier Range Regulation Circuit to force the values of the PWMDATA to be within the maximum and minimum amplitude range (i.e., within ±MaxCount) of the CARRIER CNT without software compensation. The Carrier Range Regulation Circuit comprises an Absolute Value Converter, a Comparator, a Selector and a Sign Assigner Circuit. The Absolute Value Converter takes the absolute value of the PWMDATA and inputs this value to the Comparator and the Selector. Subsequently, as shown in FIG. 6, the Sign Assigner Circuit will reverse this process by reinstalling the appropriate sign value. The circuitry of such a sign assigner circuit is known to one of ordinary skill in the art.

The Comparator compares this input with its other input, the MaxCount of the CARRIER CNT signal. If the PWMDATA absolute value is less than or equal to the MaxCount value, the resulting output of the Comparator is 0. If the PWMDATA absolute value is greater than the MaxCount value, the resulting output of the Comparator is 1. The output of the Comparator is then routed to the Selector as another input. A "0" input into the Selector signifies that the PWMDATA value is selected as the output (PWMCMD PRE) of the Carrier Range Regulation Circuit. A "1" input into the Selector signifies that the MaxCount value is selected as the output (PWMCMD PRE) of the Carrier Range Regulation Circuit. Hence, this selection manner ensures against out of bound PWM waveforms and thus prevents the loss of PWM duty cycle and perturbation to the frequency spectrum of the desired AC waveform.

Additionally, the present invention may include a PWM Pulse Feedback Circuit and a Deadtime Circuit which work in combination to overcome the prior art's out of synchronization problem resulting from a deadtime duration that is not shorter than the duration of the PWM PULSE signal. The Feedback Circuit includes a Differential Circuit 2 and a Sensor Circuit working in combination to monitor the PWM pulse signals that are generated. In one embodiment, the Differential Circuit 2 includes a plurality of clocked D-flip flop devices and an XOR logic gate to generate a trigger signal PWM EDGE that indicates level transitions of PWM PULSE. In a preferred embodiment, the Sensor Circuit includes three consecutive clocked D-flip flop devices to generate a gating signal PWM SW which is asserted high ("1") only when the deadtime is much greater than the duration of PWM PULSE signal. In this case, the gating signal PWM SW temporarily forces the input to the PWM Pulse Generator (PWMCMD) to zero. This solves the out of synchronization problem of the prior art when the deadtime duration is much greater than the duration of the PWM PULSE.

The Deadtime Circuit includes a Deadtime Comparator, a Critical Point Sensor and a Differential Circuit 2 similar to the one in the Feedback Circuit. In a preferred embodiment, the Differential Circuit 2 includes a plurality of clocked D-flip flop devices and an XOR logic gate to generate a trigger signal PWM EDGE that indicates level transitions of PWM PULSE. In one embodiment, the Critical Point Sensor includes a plurality of clocked D-flip flop devices, a Differential Circuit 1 and an AND gate. The Critical Point Sensor detects the critical point case (i.e., when the duration of PWM PULSE nearly equals or equals the duration of the deadtime period) and generates notification signals to the next component in the Deadtime Circuit. In a preferred embodiment, the Deadtime Comparator includes a plurality of D-flip flop devices, two selectors, two binary counters, a latch and a Differential Circuit 1. The Deadtime Comparator modifies the PWM PULSE input signal to the PWM OUT by masking it when prompted by the outputs of the Critical Point Sensor. In addition, the Deadtime Comparator generates two notification signals DT LD and DT CLR which indicate the end of the deadtime period. The three components of the Deadtime Circuit work in combination to modify the output signal, PWM OUT, to avoid the out of synchronization condition when the critical point cases (i.e, deadtime duration nearly equals or equal to the duration of the PWM PULSE) are detected.

Thus, the out of synchronization problem of the prior art is solved by the Deadtime Circuit and the Feedback Circuit. The Deadtime Circuit will mask the out of synchronization condition when the deadtime duration is nearly equal to or equal to the PWM PULSE duration, and the Feedback Circuit will mask the out of synchronization condition when the deadtime duration is much greater than duration of PWM PULSE.

Accordingly, one of the objects of the invention is to provide circuitry for masking the out of synchronization condition.

It is the further object of the invention to provide circuitry for reducing loss of the PWM pulse cycle and hence prevent compromising the frequency spectrum of the desired AC waveform without requiring complicated software or additional CPU or DSP processing time.

Other and further objects and advantages of the present invention will be further understood and appreciated by those skilled in the art by reference to the following specification, claims and drawings.

DETAILED DESCRIPTION OF THE INVENTION

The present invention is directed to a pulse width modulation ("PWM") controller for inverters. The prior art PWM controllers experience PWM duty cycle loss when the amplitude of the sine wave PWMDATA is outside the maximum or minimum amplitude range of the high frequency triangular carrier CARRIER CNT. Additionally, when the duration of the deadtime is greater than, nearly equals or equal to the duration of the PWM PULSE signal, the prior art PWM controllers experience an out of synchronization problem. These two problems are solved by the present invention described herewith.

Figure 1:
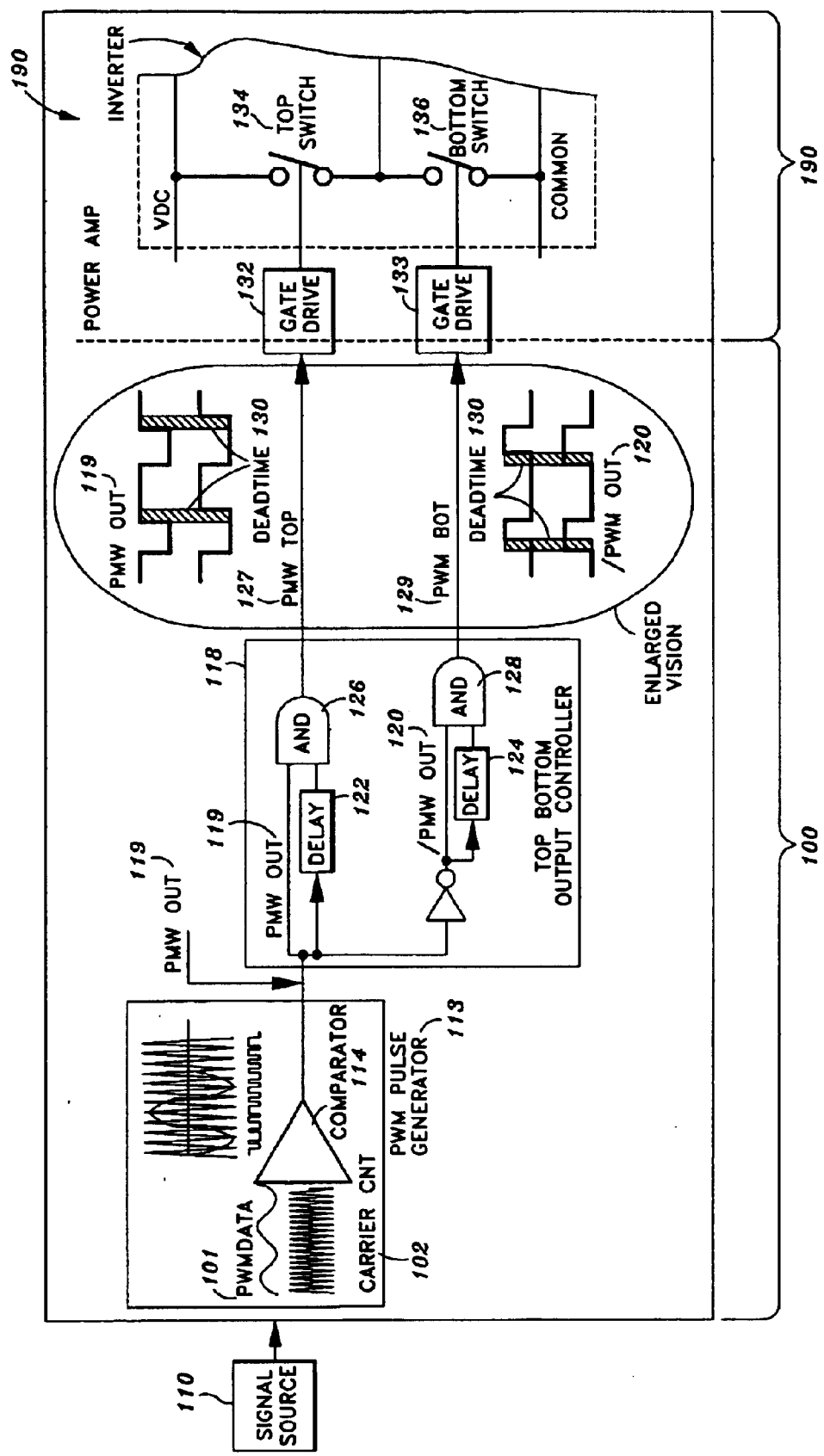
FIG. 1 is a block diagram of a prior art Pulse Width Modulation ("PWM") controller for a DC to AC inverter, coupled to a signal source and an inverter (partially shown).
Figure 5:
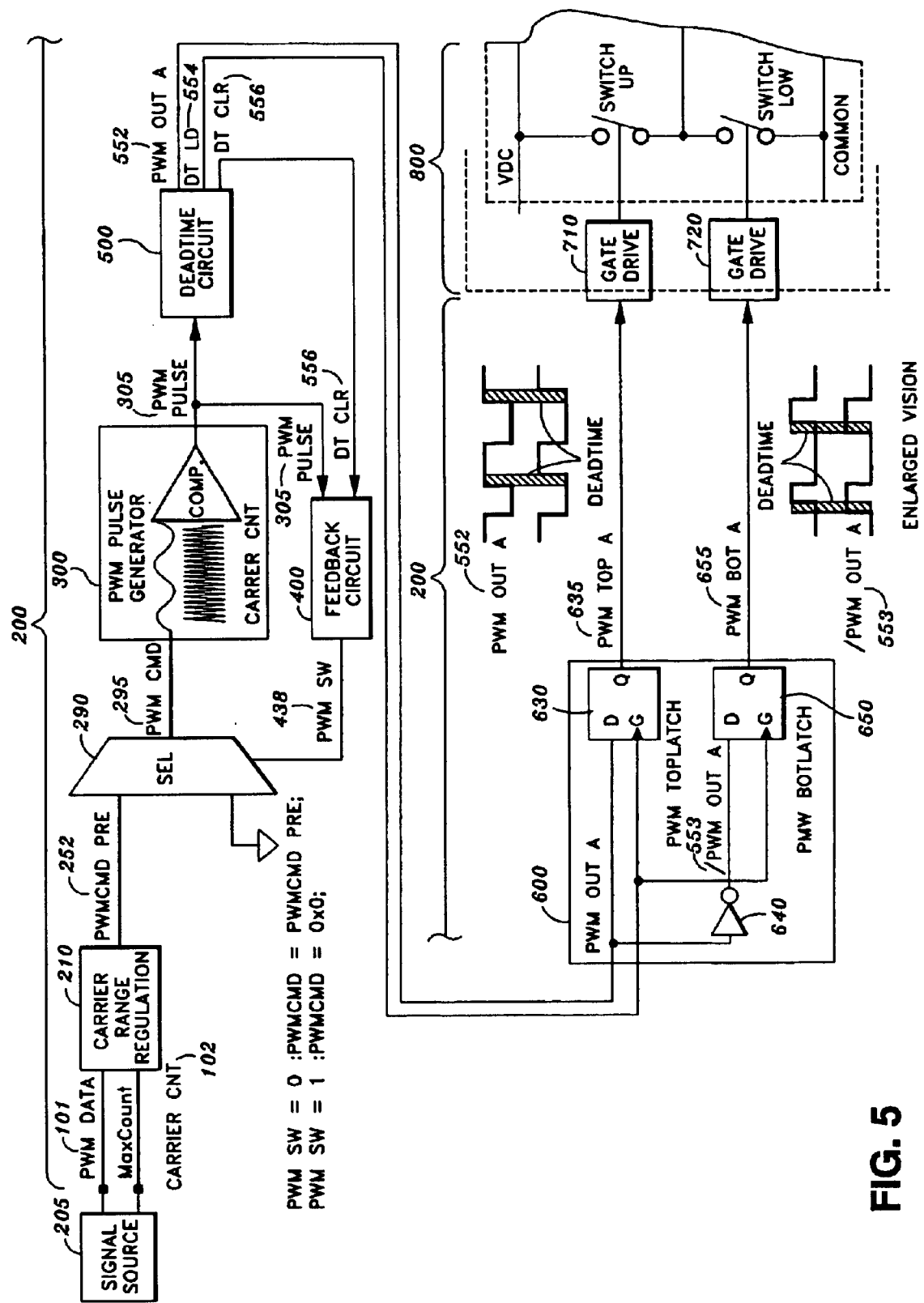
FIG. 5 is a block diagram of the controller for a DC to AC inverter coupled to an inverter (partially shown) in accordance with the present invention.

FIG. 5 is a block diagram of the present invention PWM controller 200 coupled to an inverter 800 (partially shown). In a preferred embodiment, the PWM controller 200 comprises a Carrier Range Regulation Circuit 210, a selector 290, a PWM PULSE Generator 300, a Feedback Circuit 400, a Deadtime Circuit 500 and a PWM Latch 600. In one embodiment, two gate drives 710, 720 are added. In another embodiment, the PWM controller 200 may include an inverter 800. In yet another embodiment, the PWM controller 200 may include a signal source 205 as shown in FIG. 5. The signal source 205 is any means, known to one of ordinary skill in the art, for generating time varying waveforms such as, but not limited to, a sinusoidal waveform PWMDATA 101 and a high frequency triangular waveform CARRIER CNT 102 shown in FIG. 1.

Figure 6:
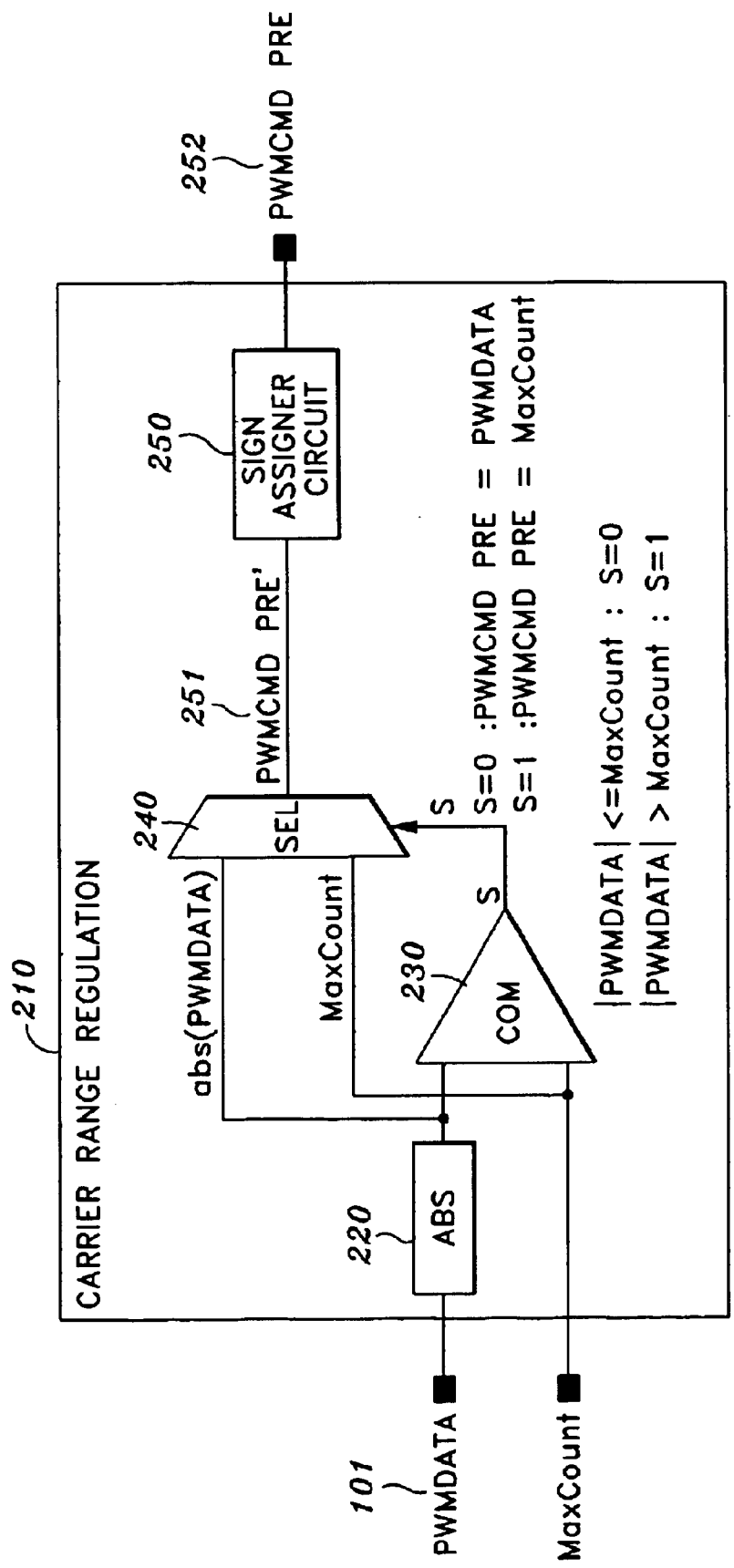
FIG. 6 is a block diagram of the Carrier Range Regulation Circuit.
Figure 7:
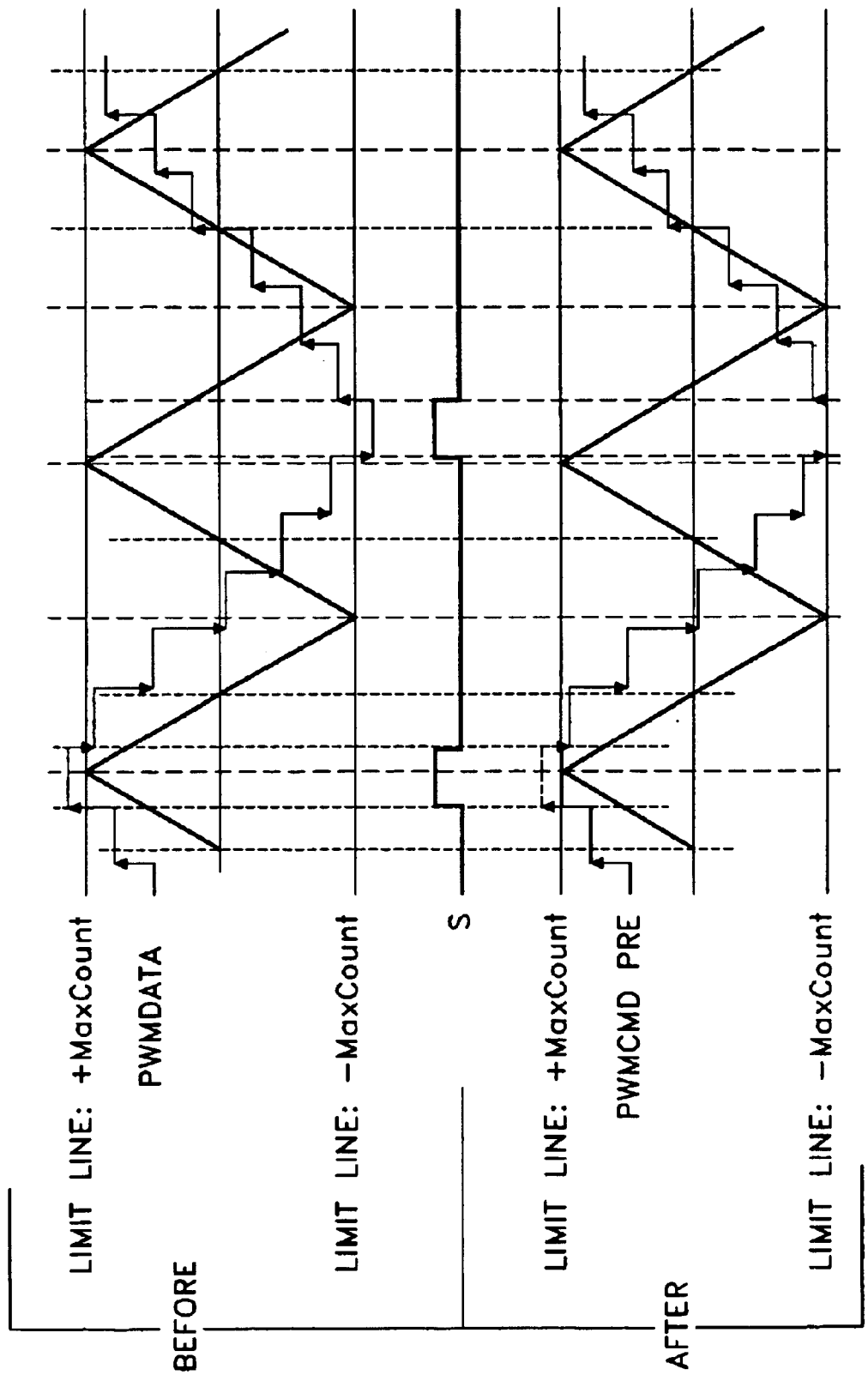
FIG. 7 depicts the waveform relationship between signals PWMDATA and CARRIER CNT before and after passing the signals through the Carrier Range Regulation Circuit.

FIG. 6 shows the Carrier Range Regulation Circuit 210 whose function is to force the values of the PWMDATA 101 to be within the maximum and minimum amplitude range (i.e., within ±MaxCount) of the CARRIER CNT 102. The Carrier Range Regulation Circuit 210 comprises an absolute value converter 220, a comparator 230, a selector 240 and a sign assigner circuit 250. The two inputs to the Carrier Range Regulation Circuit 210, are the PWMDATA 101 and the MaxCount of the CARRIER CNT 102 generated by the signal source 205. The absolute value converter 220 takes the absolute value of the PWMDATA 101 and inputs this value to the comparator 230. The other input to the comparator 230 is the MaxCount. The comparator 230 compares the absolute value of the PWMDATA 101 with the MaxCount of the CARRIER CNT signal and generates a binary bit S of either "0" or "1" (depending on the results of the comparison). If the absolute value of the PWMDATA 101 is less than or equal to the MaxCount value, the resulting output of the Comparator, S, is 0. If the absolute value of the PWMDATA 101 is greater than the MaxCount value, the resulting output of the Comparator, S, is 1. The S output binary bit is then routed to the input of selector 240. A "0" input into selector 240 will cause the selector to select PWMDATA 101 for its output, PWMCMD PRE' 251. A "1" input into the selector 240 will cause the selector 240 to select the MaxCount value for its output, PWMCMD PRE' 251. In a preferred embodiment, an appropriate sign value is assigned to PWMCMD PRE' 251 by sign assigner circuit 250 and then is outputted by the Carrier Range Regulation Circuit 210 as PWMCMD PRE 252. FIG. 7 depicts the waveform relationship between signals PWMDATA 101 and CARRIER CNT 102 before and after passing the signals through the Carrier Range Regulation Circuit 210. As shown in FIG. 7, prior to passing the signals through Carrier Range Regulation Circuit 210, the amplitude of PWMDATA 101 was outside the ±MaxCount range in two instances. After passing the signals (PWMDATA 101 and CARRIER CNT 102) through Carrier Range Regulation Circuit 210, the output signal of Carrier Range Regulation Circuit 210, PWMCMD PRE 252 is selected to be within the ±MaxCount. In implementing this selection manner, the Carrier Range Regulation Circuit 210 ensures that a PWM waveform input (PWMCMD PRE 252) to the PWM controller 200 is bounded within the desired maximum and minimum amplitude range. This prevents the loss of PWM duty cycle and thus prevent perturbation to the frequency spectrum of the desired AC waveform.

Pulse Generator 300 (as shown in FIG. 5) operates in the same manner as corresponding element PWM Pulse Generator 113 in the prior art controller unit 100. The output of Pulse Generator 300 is a variable square wave signal, PWM PULSE 305, which is fed into Feedback Circuit 400 and also fed into Deadtime Circuit 500.

Figure 8:
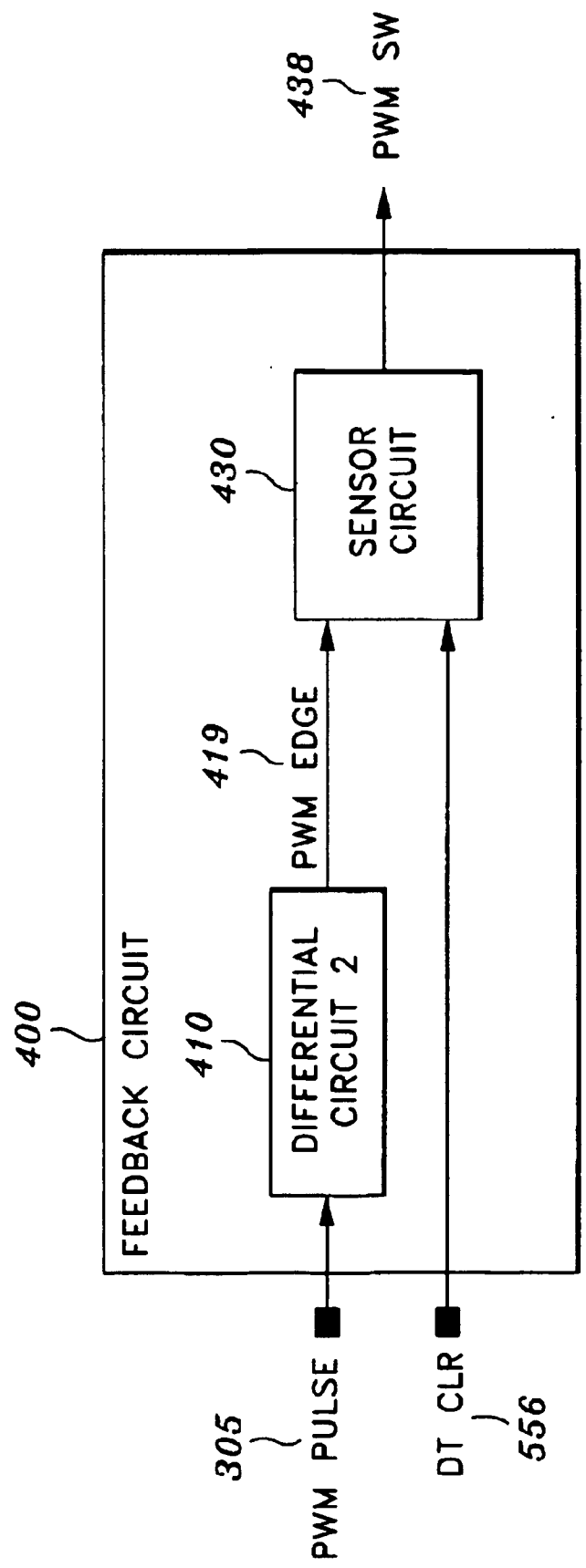
FIG. 8 is a block diagram of the Feedback Circuit.
Figure 15:
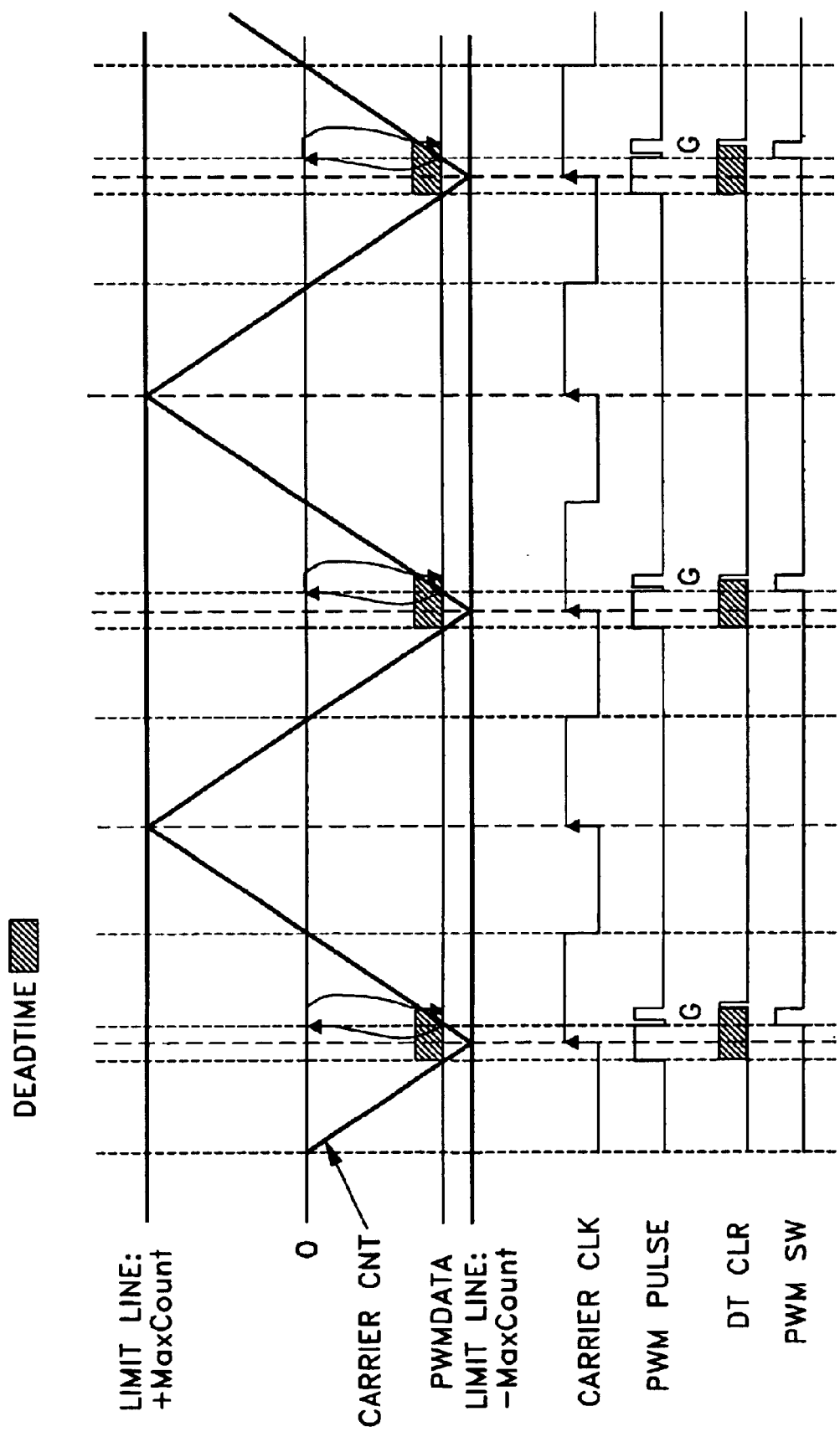
FIG. 15 illustrates the effects of the Feedback Circuit on the PWM waveform (PWM SW).

FIG. 8 is a block diagram of a preferred embodiment of the Feedback Circuit 400. The Feedback Circuit 400 comprises a differential circuit 2 410 coupled to a sensor circuit 430. An input signal to the Feedback Circuit, the PWM PULSE 305 from PWM Pulse Generator 300, is fed into differential circuit 2 while another input signal, DT CLR 556 from Deadtime Circuit 500, is fed to sensor circuit 430. DT CLR 556 is a notification signal for indicating the end of the deadtime. The differential circuit 2 410 and sensor circuit 430 work in combination to monitor the internally generated signals and provide a feedback control for selecting an appropriate PWM waveform to drive the load (i.e., inverter 800). FIG. 15 illustrates the effects of the Feedback Circuit on the PWM waveform (PWM SW). At point G, the PWM PULSE value will change from high to low since the amplitude of PWM CMD 295 is within the amplitude range of CARRIER CNT. Without the effects of the Feedback Circuit, the PWM PULSE value would stay low after point G. However, DT CLR 556 (which is fed to the Feedback Circuit) indicates that deadtime continues and is still being counted. Thus, PWM SW (an output of the Feedback Circuit) turns "on" to a high value, causing PWM PULSE to change its value back from low to high until DT CLR 556 indicates the end of the deadtime period. By immediately recovering the value of PWM PULSE back to its high state, the glitch at point G is masked.

Figure 9:
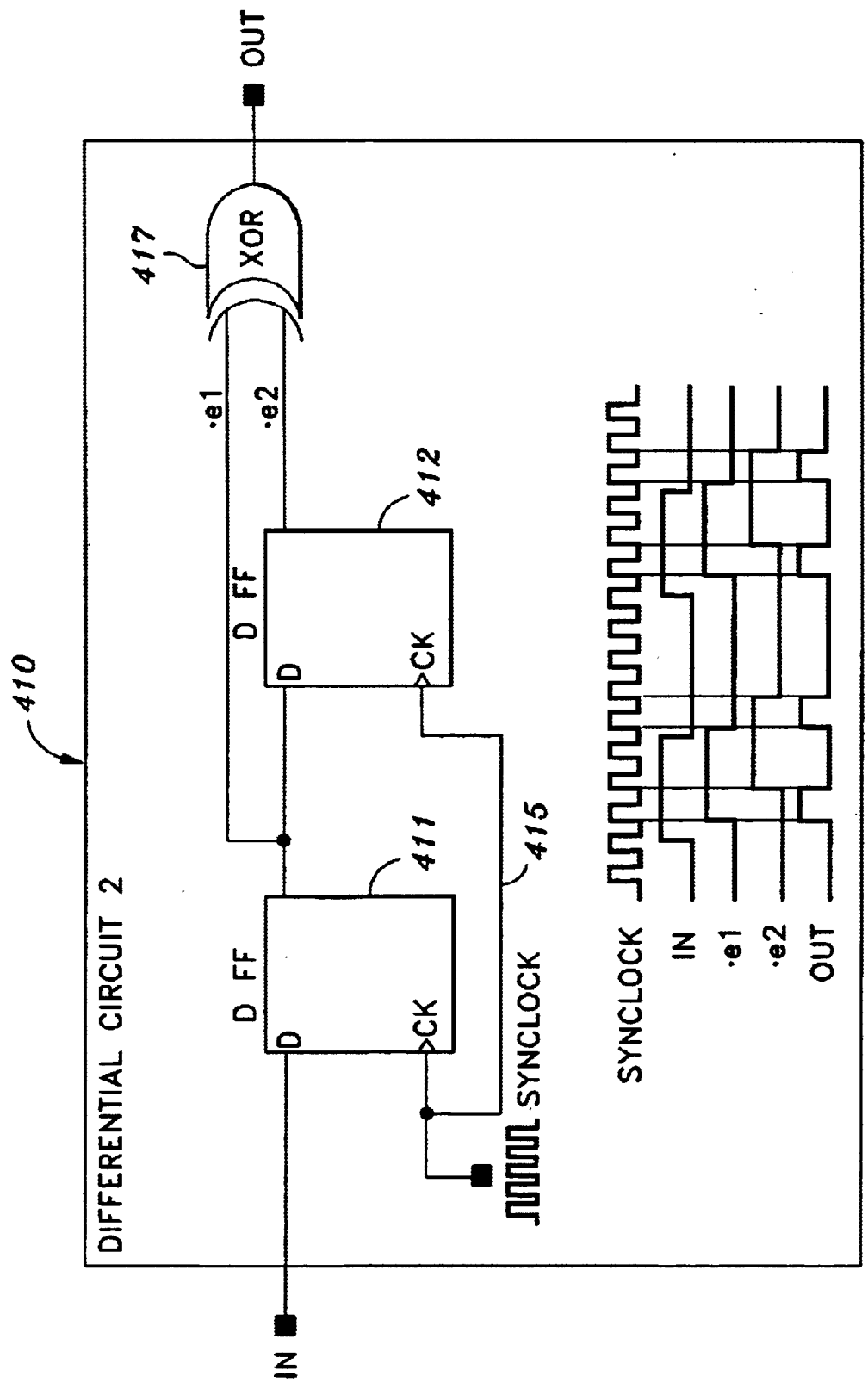
FIGS. 9 and 10 are digital logic diagrams of a first embodiment of a Differential Circuit.

In a preferred embodiment, as shown in FIG. 9, the differential circuit 2 410 includes two consecutive clocked D-flip flop devices 411, 412 which are individually coupled to an XOR logic gate 417. Both clocked D-flip flop devices 411, 412 are also separately coupled to a synchronization clock 415 for synchronizing their outputs. The XOR logic gate 417 (in accordance with standard XOR gate logic as understood by one or ordinary skill in the art) generates a trigger signal PWM EDGE 419 (as an output signal of differential circuit 2 410) that indicates level transitions of PWM PULSE 305.

Figure 11:
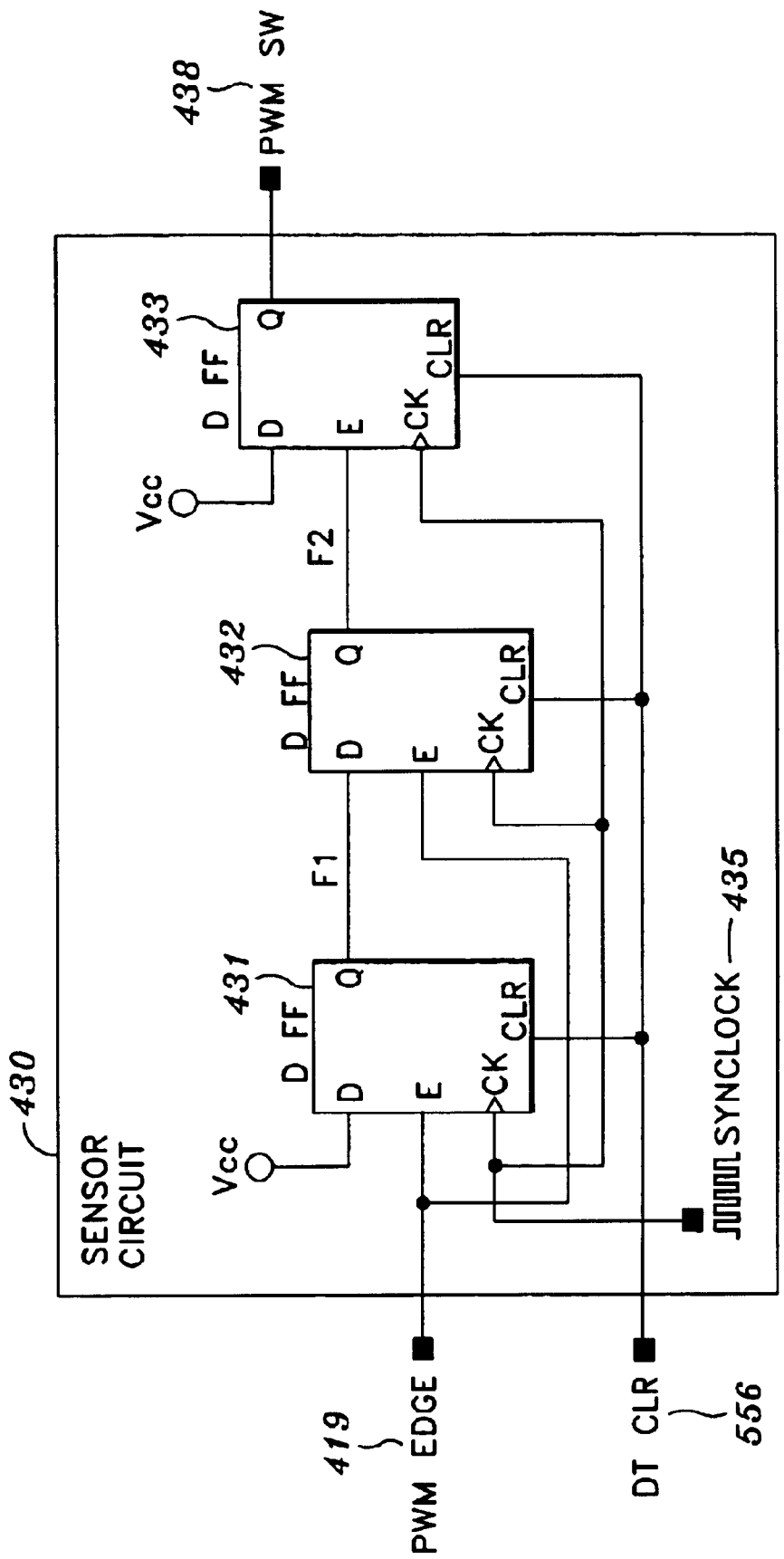
FIG. 11 is a digital logic diagram of a Sensor Circuit.

In a preferred embodiment, as shown in FIG. 11, the sensor circuit 430 comprises three consecutive clocked D-flip flop devices 431, 432 & 433, each separately coupled to a synchronization clock 435 for synchronizing their outputs. The sensor circuit 430 passes its two input signals (PWM EDGE 419 and DT CLR 556) through the three consecutive clocked D-flip flop devices 431, 432 & 433 to generate a gating signal PWM SW 438. (Clocked D-flip flop devices and their logic are understood by one of ordinary skill in the art.) PWM SW 438 is asserted high ("1") only when the deadtime duration is much greater than the duration of PWM OUT 552 or /PWM OUT 553 signals. In this case, the selector 290 based on the gating signal PWM SW 438 value (and following standard selector logic that is understood by one of ordinary skill in the art) temporarily forces the input to the PWM Pulse Generator (PWMCMD 295) to zero. With the presence of a zero value PWM waveform (PWMCMD 295 equals zero value) as its input, the PWM Pulse Generator 300 will temporarily stop its generation of a PWM pulse signal until the abnormal condition is cleared. This eliminates the out of synchronization problem which occurs when deadtime duration is much greater than the duration of the PWM PULSE 305.

Figure 2:
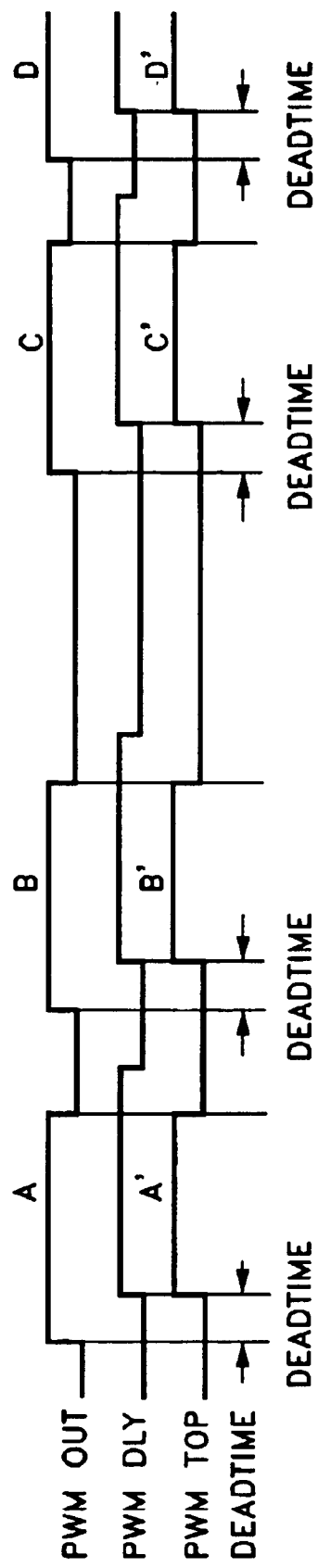
FIG. 2 depicts PWM pulse waveforms in the normal condition.
Figure 12:
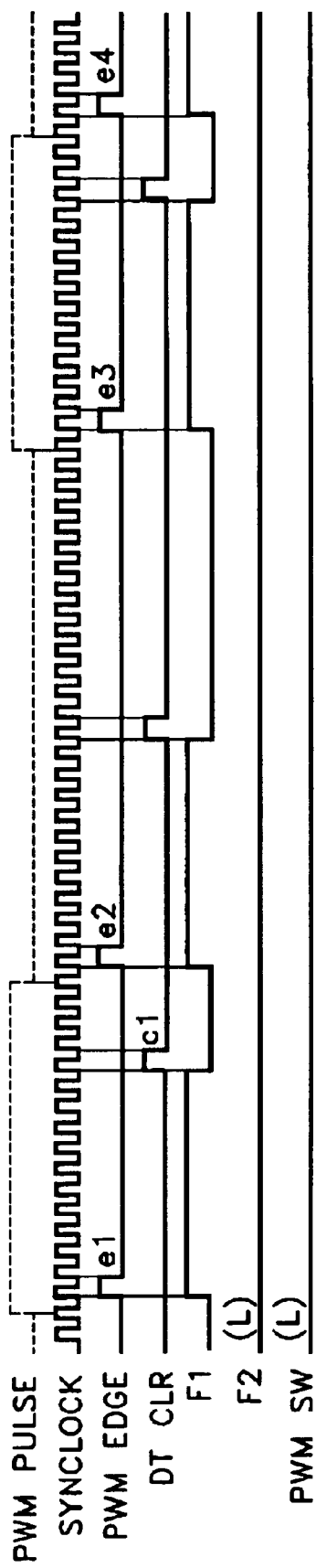
FIG. 12 depicts various generated waveforms in the Feedback Circuit under a normal condition.
Figure 13:
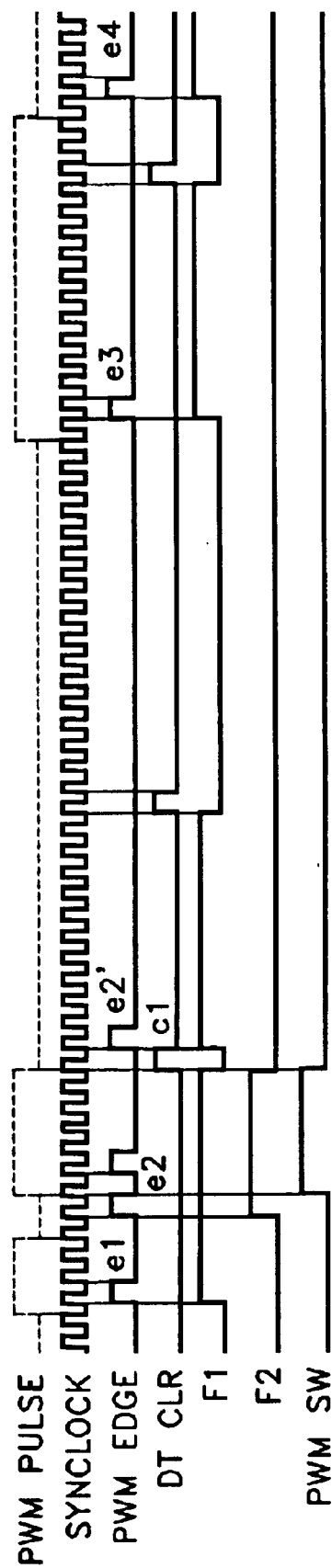
FIG. 13 depicts various generated waveforms in the Feedback Circuit under an abnormal condition when the generated PWM waveform has a longer duration than the duration of the deadtime delay.
Figure 14:
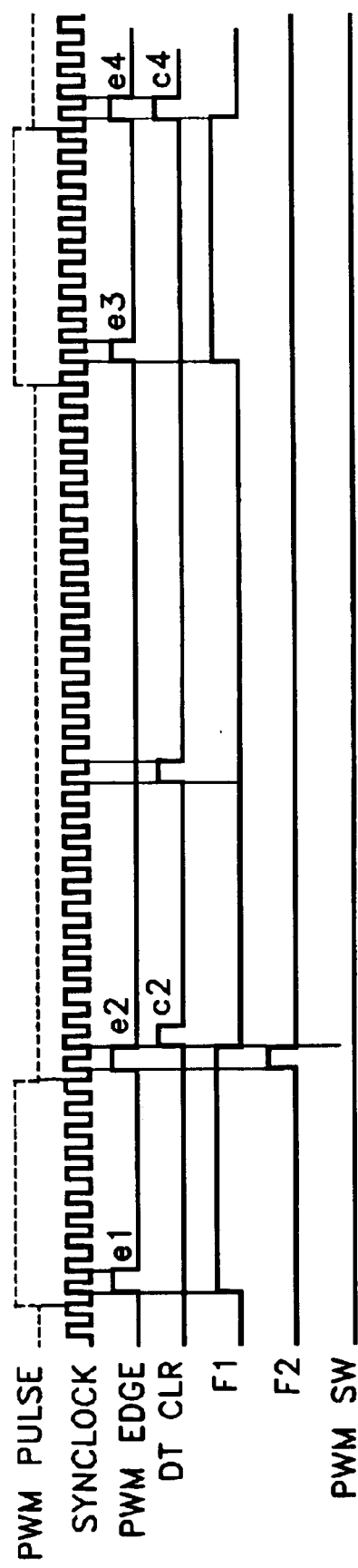
FIG. 14 depicts various generated waveforms in the Feedback Circuit under an abnormal condition when the generated PWM waveform has a longer duration equal to the duration of the deadtime delay.

FIGS. 12, 13 and 14 depict the relationships of the PWM PULSE 305, PWM EDGE, DT CLR 556 and PWM SW 438 waveforms under normal, abnormal and critical point conditions. In FIG. 12, the duration of the deadtime is shorter than the duration of the PWM PULSE 305. This is indicated by comparing the e1 and e2 pulses of the PWM EDGE 592 with the c1 pulse of the DT CTR 556. Pulse e1 indicates the rising edge of the PWM PULSE 305 while pulse e2 indicates its falling edge. Pulse c1 indicates the end of the deadtime. As shown in FIG. 12, PWM SW 438 is low (i.e., it has a "0" value). Given that PWM SW 438 is a "0", the PWMCMD 295 output of Selector 2 will equal PWMCMD PRE 252 since there is no out of synchronization problem as shown in FIG. 2.

Figure 3:
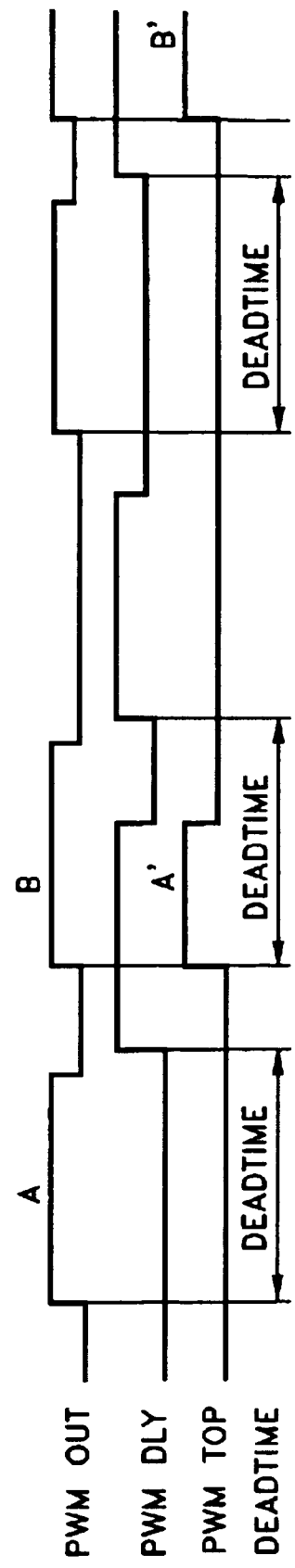
FIG. 3 depicts PWM pulse waveforms in an abnormal condition.
Figure 4:
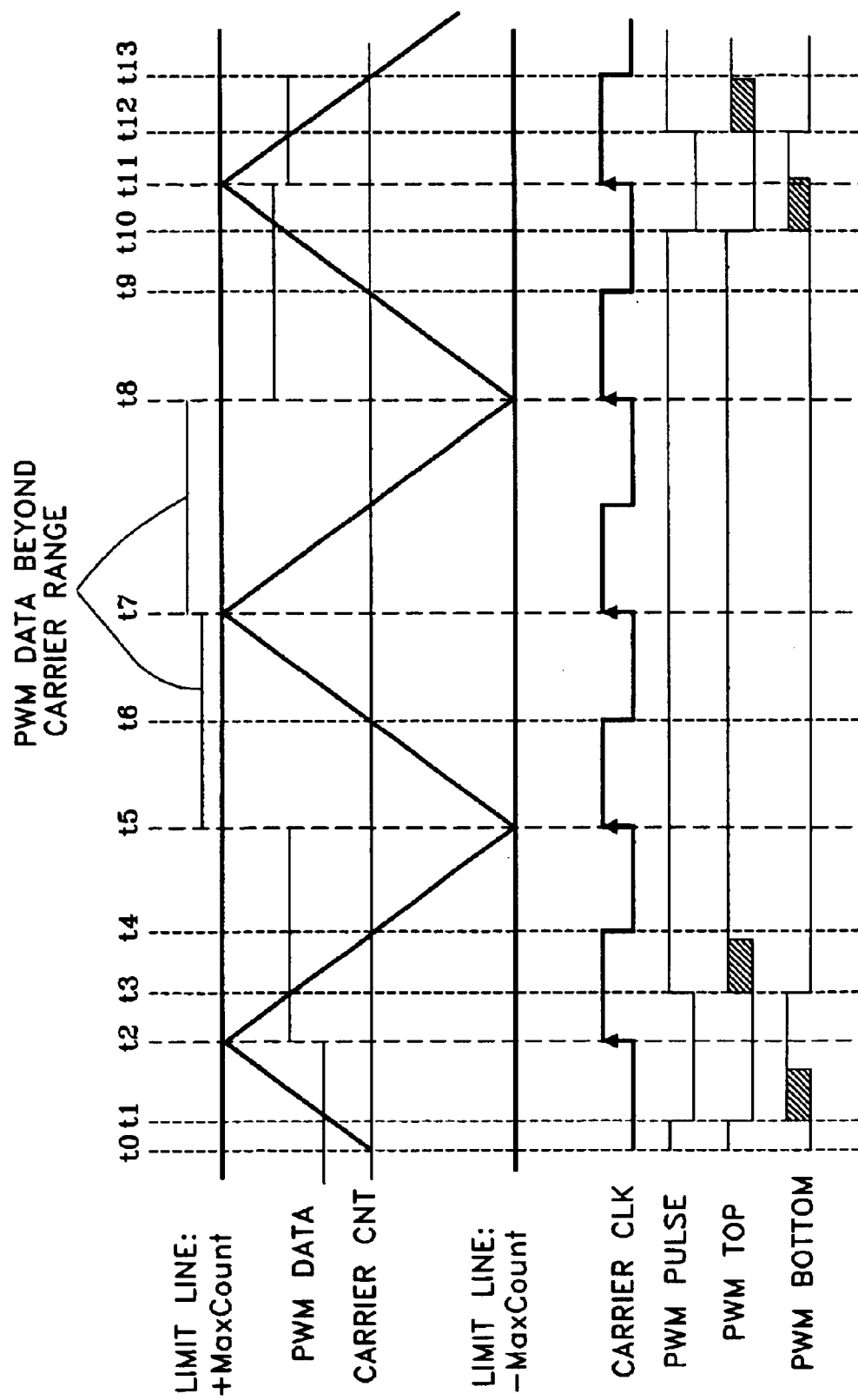
FIG. 4 depicts the waveform relationships between signals PWMDATA and CARRIER CNT.

FIG. 13 shows that the duration of the deadtime is longer than the duration of the PWM PULSE 305. This is indicated by comparing the e1 and e2 pulses of the PWM EDGE 592 with the c1 pulse of the DT CTR 556. Pulse e1 indicates the rising edge of PWM PULSE 305 while pulse e2 indicates its falling edge. Pulse c1 indicates the end of the deadtime. Since c1 pulse occurs later in time than the e2 pulse, this indicates that the deadtime period outlast the duration of the PWM PULSE 305. When the deadtime period outlasts the duration of the PWM PULSE 305, it causes an out of synchronization condition which is illustrated in FIG. 3 where the PWM OUT 552 waveform is out of synchronization with the PWM TOP 635 waveform. During this out of synchronization time interval, the PWM SW 438 is high (i.e., it has a "1" value) as shown in FIG. 13. Given that PWM SW 438 is a "1" during this time interval, Selector 2 will select a zero value for its output PWMCMD 295 to mask the out of synchronization condition.

In FIG. 14, the duration of the deadtime nearly equals the duration of the PWM PULSE 305. This is indicated by comparing nearly equals the duration of the EDGE 592 with the c2 pulse of the DT CLR 556. Pulse e1 indicates the rising edge of the PWM PULSE 305 while pulse e2 indicates its falling edge. Pulse c2 indicates the end of the deadtime. As shown in FIG. 14, PWM SW 438 is low throughout (i.e., it has a constant "0" value). Given that PWM SW 438 is a "0", the PWMCMD 295 output of Selector 2 will equal PWMCMD PRE 252 even though an out of synchronization condition exists. This critical point condition is addressed by the Deadtime Circuit 500.

Figure 16:
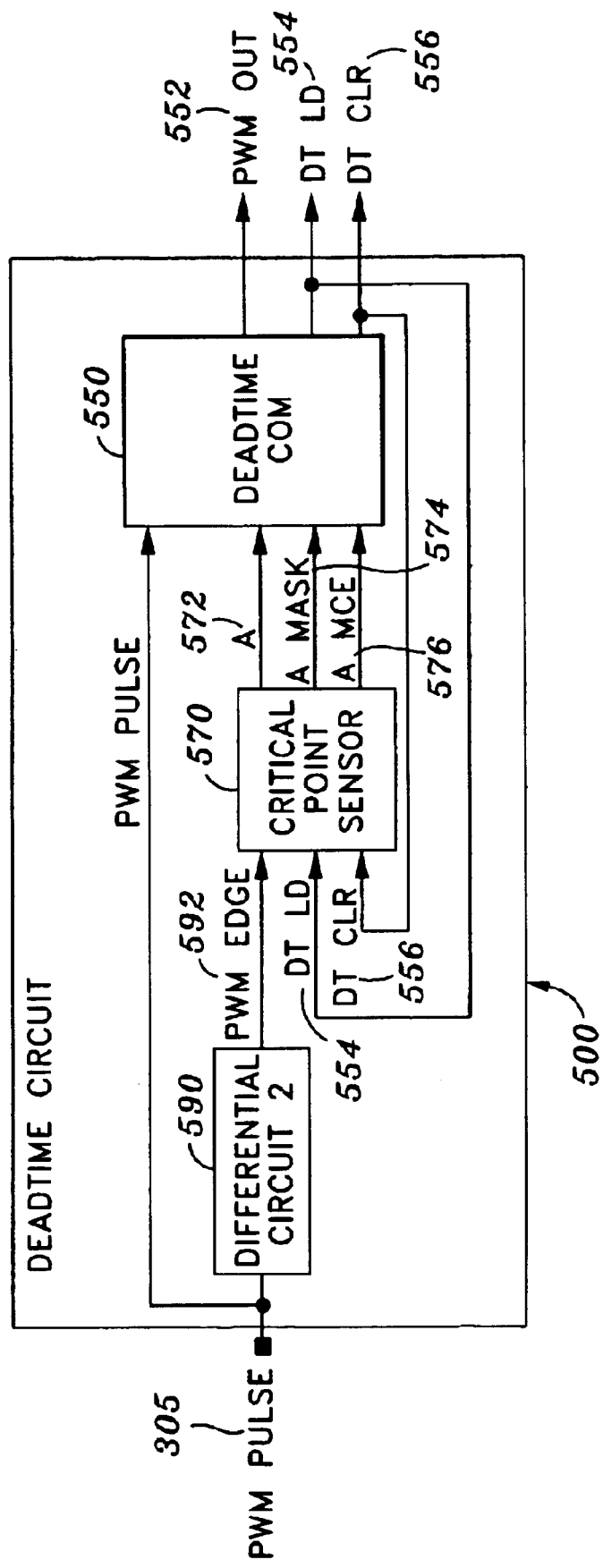
FIG. 16 is a digital logic diagram of the Deadtime Circuit.
Figure 21A:
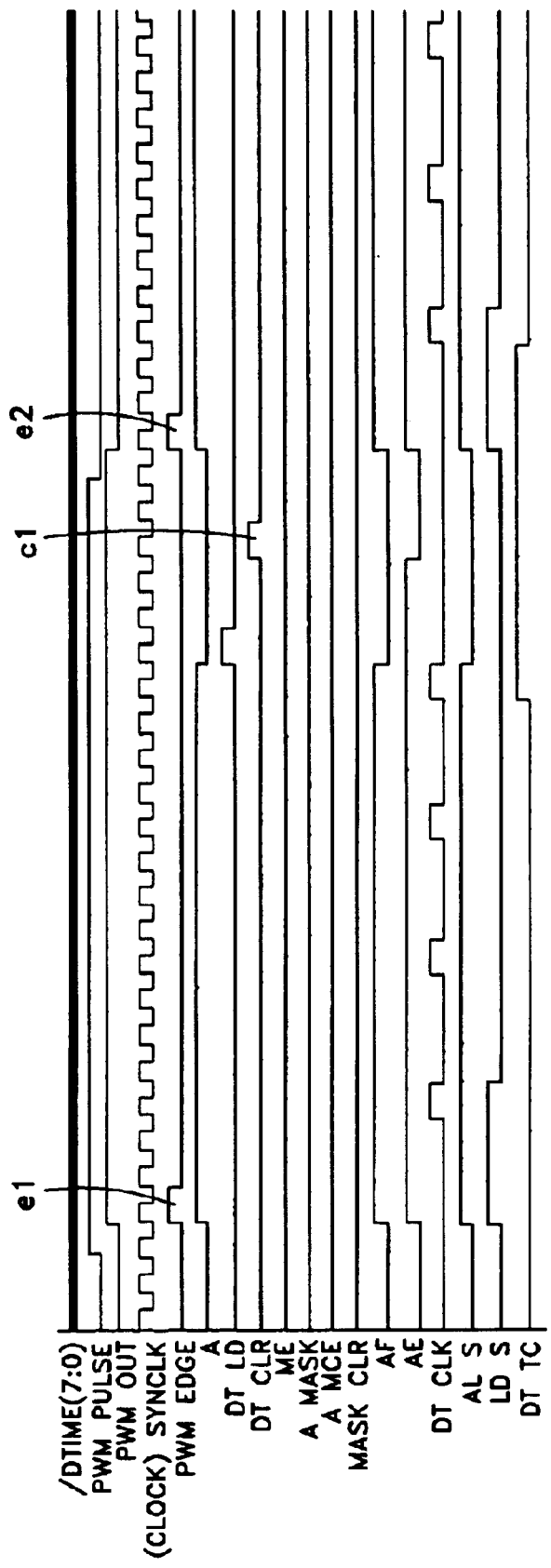
FIGS. 21A, 21B and 21C depict various generated waveforms in the Deadtime Circuit under normal and critical point conditions.
Figure 21B:
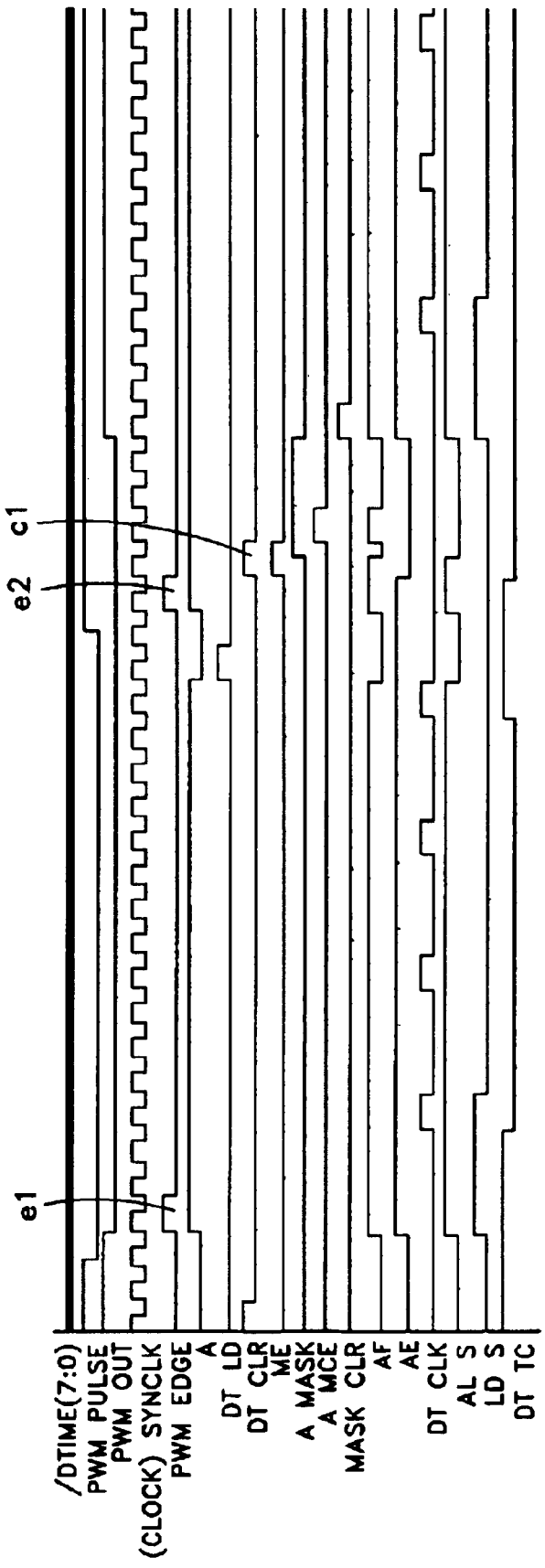
Figure 21C:
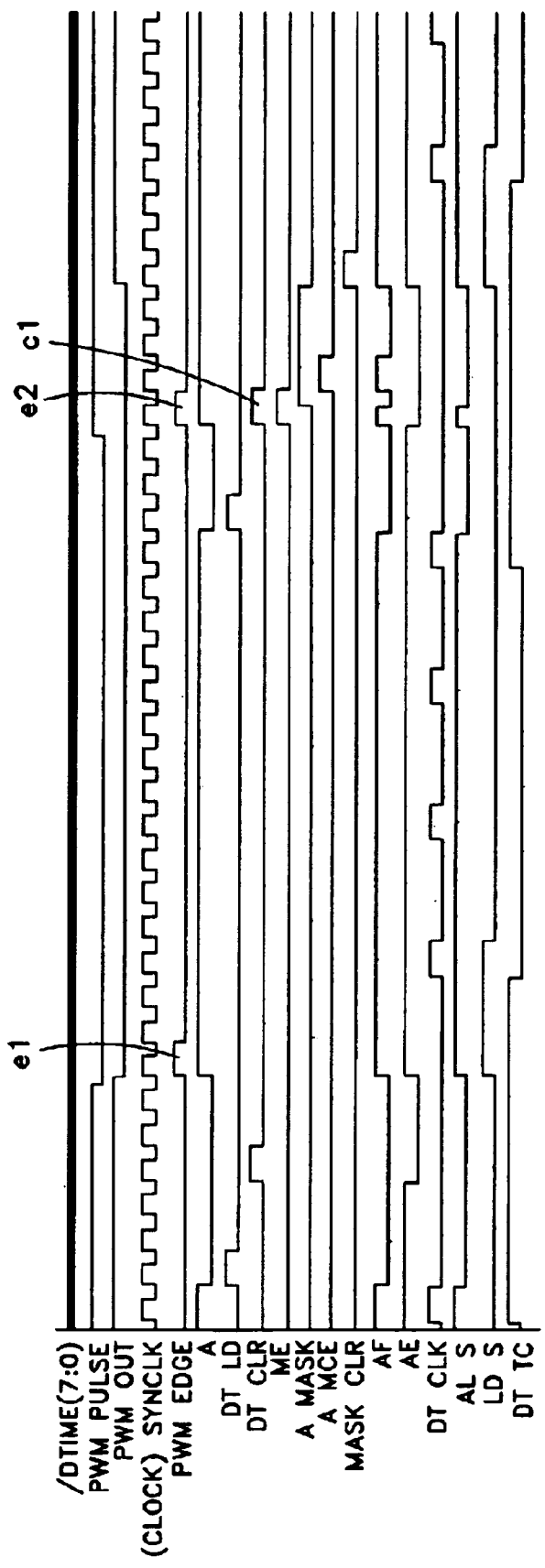

FIG. 16 is a digital logic diagram of the Deadtime Circuit 500. FIGS. 21A, 21B and 21C depict various generated waveforms in the Deadtime Circuit under normal and critical point conditions. Under normal condition, the deadtime duration is much shorter than the duration of the PWM PULSE 305 waveform. Critical point conditions occur when the deadtime duration nearly equals or equals the duration of the PWM PULSE 305 waveform.

Figure 10:
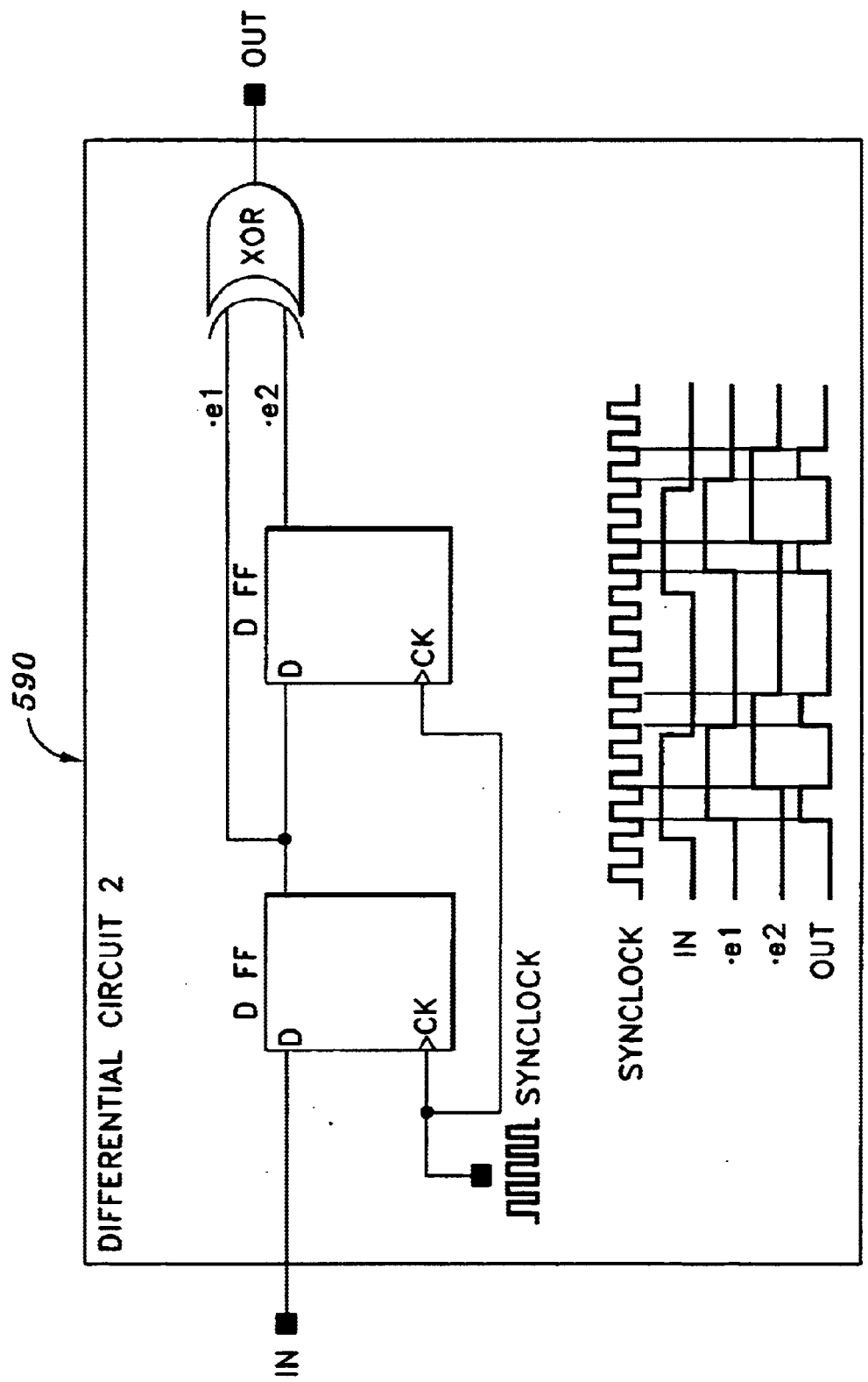

The Deadtime Circuit 500 includes a Deadtime Comparator 550, a Critical Point Sensor 570 and a Differential Circuit 2 590. The Differential Circuit 2 590 is similar to the Differential Circuit 2 410, shown in FIG. 9. The Differential Circuit 2 590 (as shown in FIG. 10) includes a plurality of clocked D-flip-flop devices and an XOR logic gate to generate a trigger signal PWM EDGE 592 that indicates level of transitions of PWM PULSE 305. The signal PWM EDGE 592 is then communicated as an input to the Critical Point Sensor 570.

Figure 17:
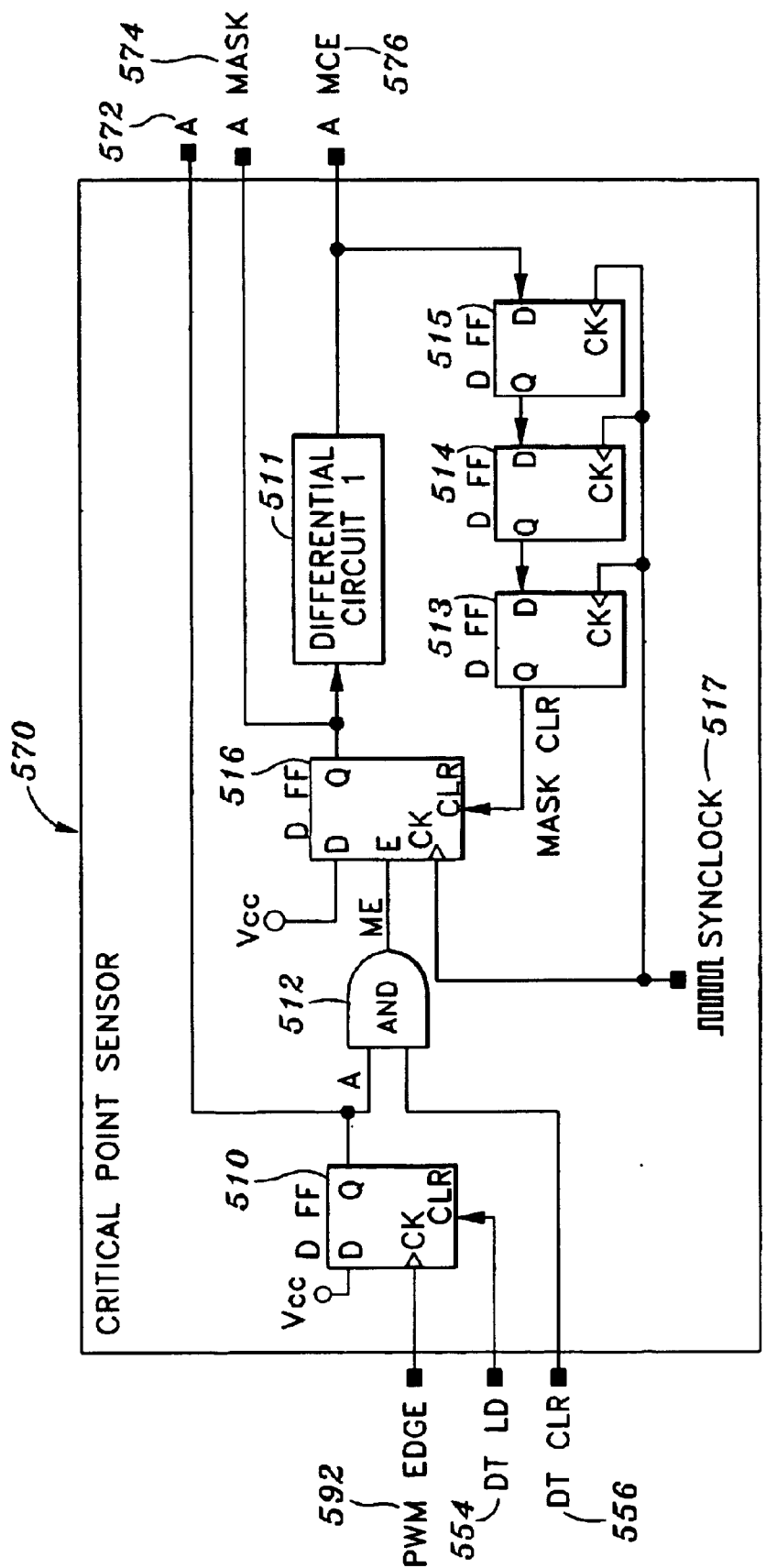
FIG. 17 is a digital logic diagram of the Critical Point Sensor Circuit.
Figure 18:
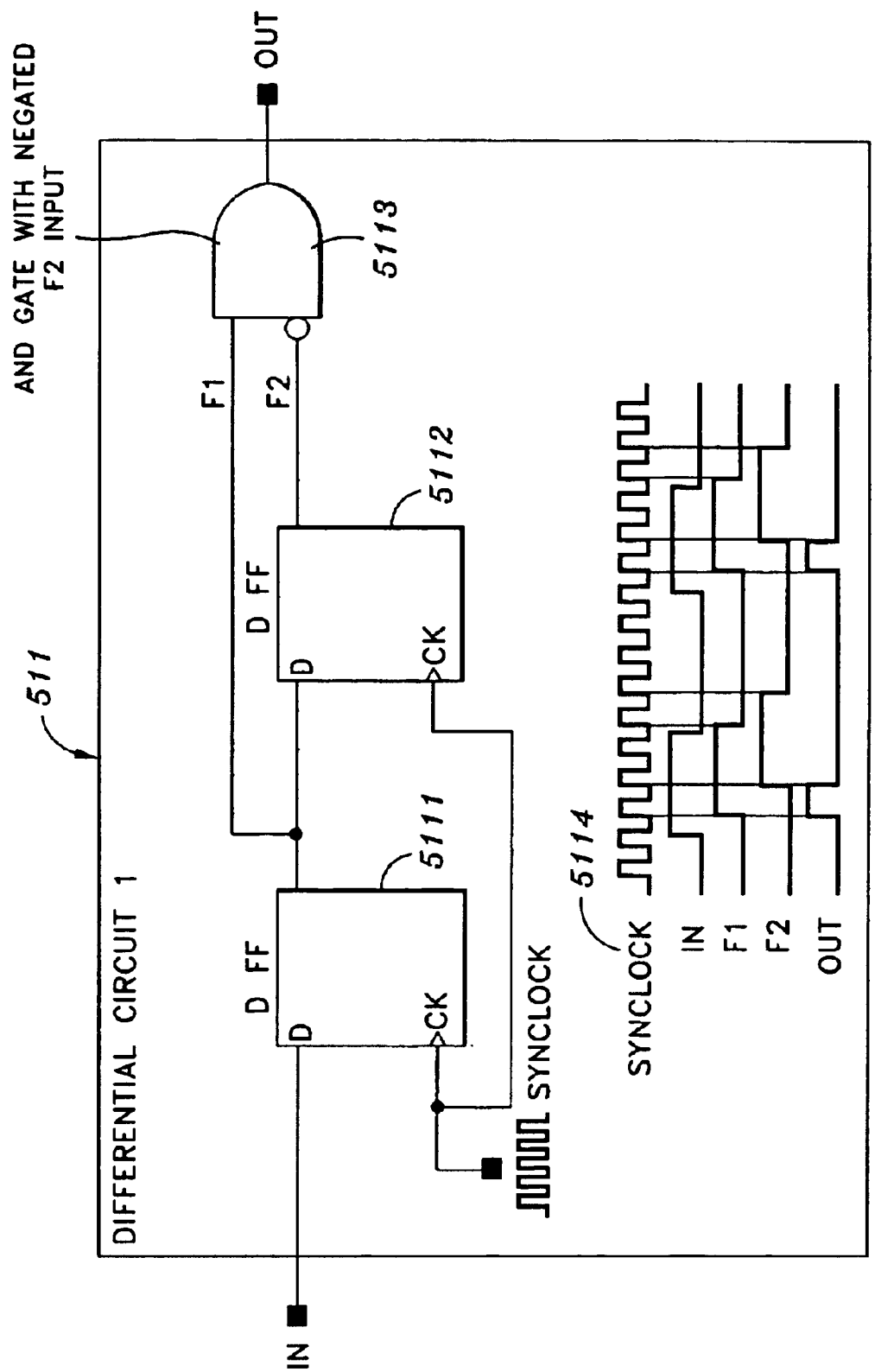
FIGS. 18 and 19 are digital logic diagrams of a second embodiment of a Differential Circuit.

In one embodiment, the Critical Point Sensor includes a plurality of clocked D-flip flop devices 510, 513, 514 & 515, a Differential Circuit 1 511, a SYNCLOCK 517 and an AND gate 512 which are electrically connected as shown in FIG. 17. The SYNCLOCK 517 provides the necessary synchronization of the internally generated PWM waveforms. FIG. 18 is a digital logic diagram of the Differential Circuit 1 511. In a preferred embodiment, the Differential Circuit 1 511 comprises two clocked D-flip flop devices 5111, 5112 coupled to an AND Gate With One Negated Input 5113 and a SYNCLOCK 5114 to provide synchronization to the clocked d-flip flop devices 5111, 5112. The inputs to the Critical Point Sensor 570 are PWM EDGE 592, DT LD 554 and DT CLR 556. DT LD 554 and DT CLR 556 are notification signals generated by Deadtime Comparator 550 for indicating the end of the deadtime period. In one embodiment, DT CLR 556 is the DT LD 554 signal delayed by three clock cycles. The Critical Point Sensor detects the critical point cases (i.e., when the duration of PWM PULSE is near equal or equals the duration of the deadtime period) and generates notification signals A 572, A MASK 574 and A MCE 576 to the next component (Deadtime Comparator 550) in the Deadtime Circuit 500.

Figure 19:
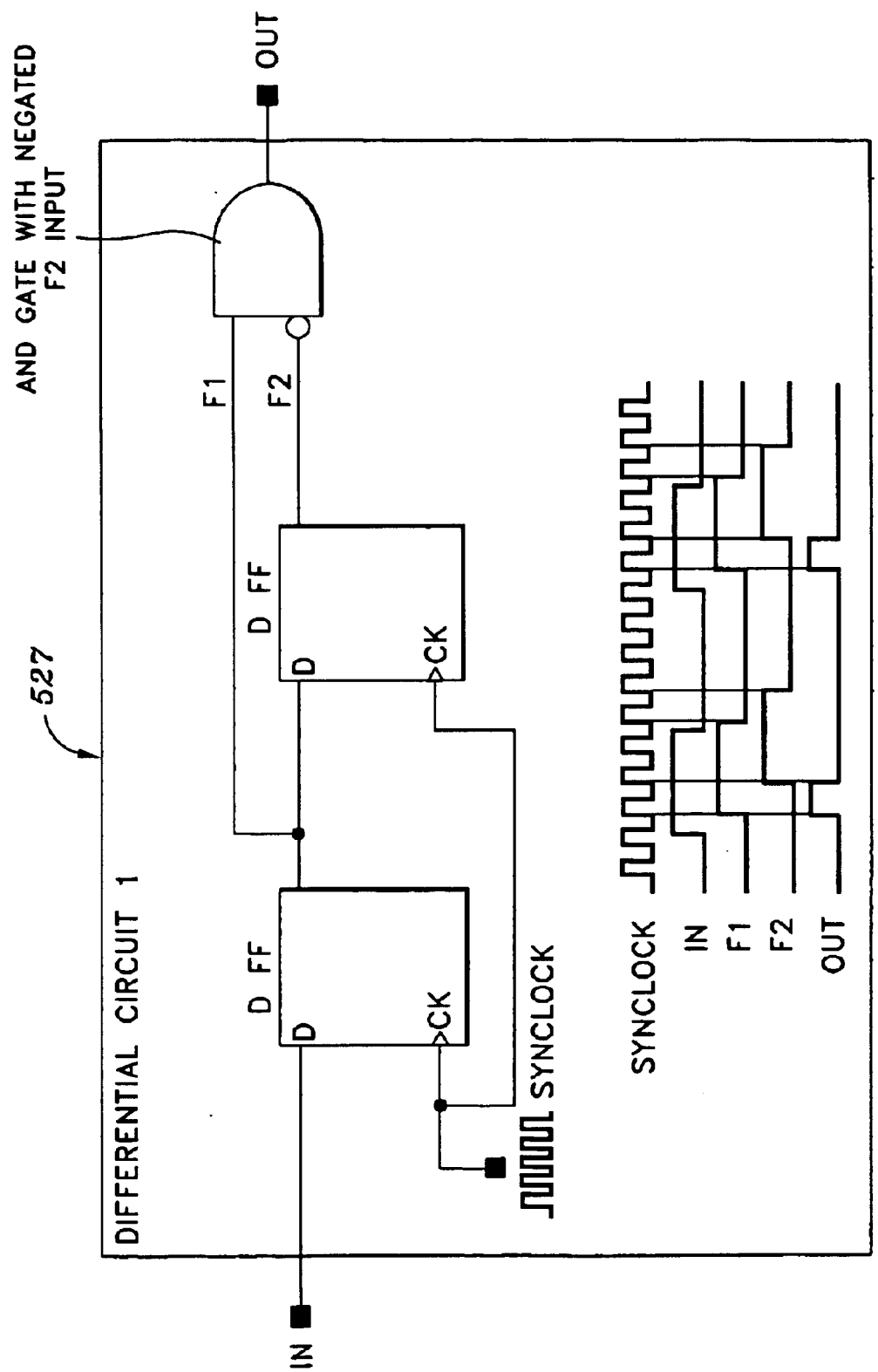
Figure 20:
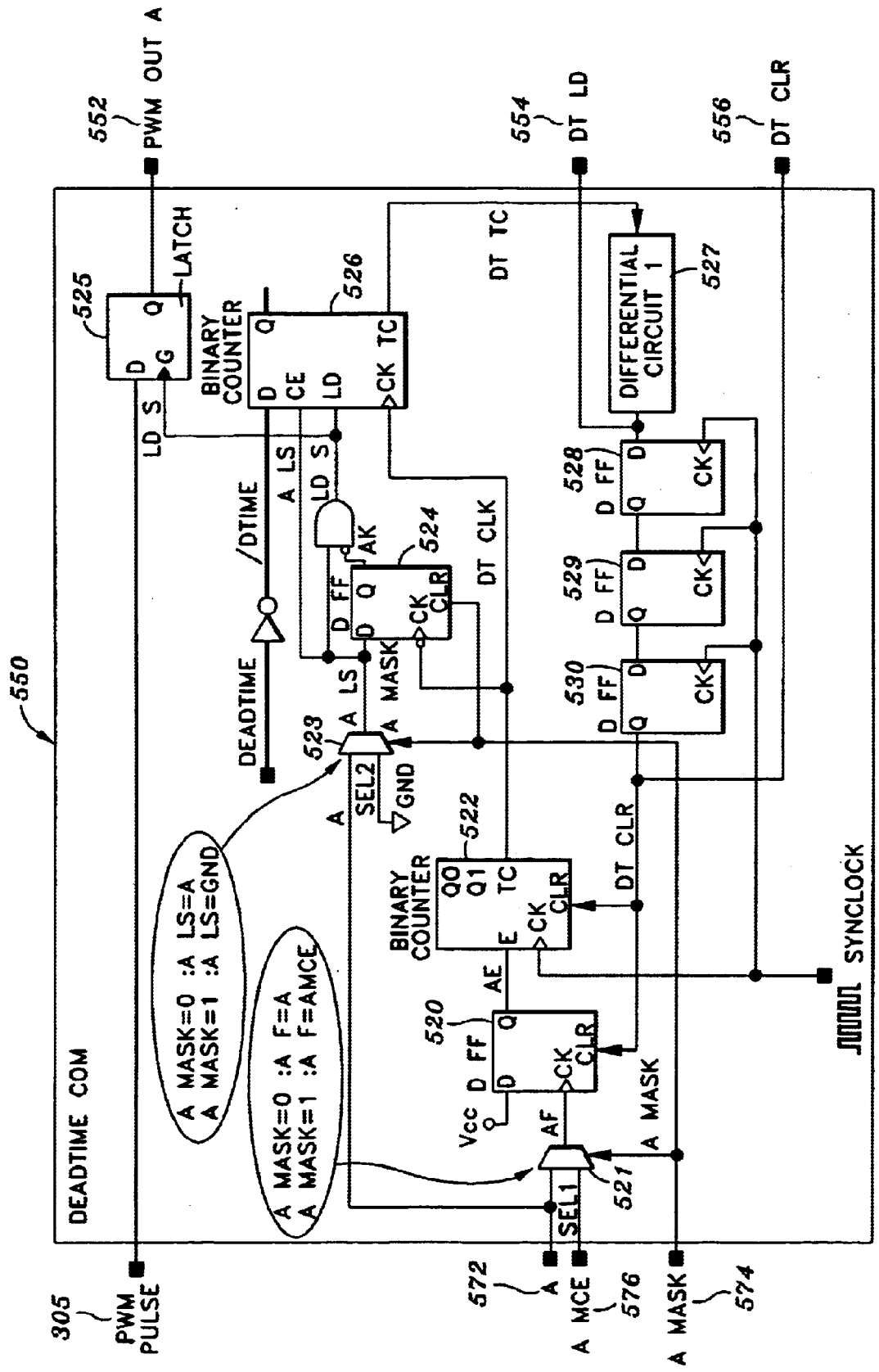
FIG. 20 is a digital logic diagram of the Deadtime Comparator Circuit.

In a preferred embodiment, the Deadtime Comparator 550 includes a plurality of D-flip flop devices 520, 524, 530, 529 & 528, two selectors 521, 523, two binary counters 522, 526, a latch 525 and a Differential Circuit 1 527 coupled electrically as shown in FIG. 20. A digital logic diagram of the Differential Circuit 1 527 is shown in FIG. 19. The inputs to the Deadtime Comparator 550 are PWM PULSE 305 and the notification signals from Critical Point Sensor 570: signals A 574, A MASK 574 and A MCE 576. In accordance with the standard logics of clocked D-flip flop devices, selectors, binary counters, gates and latches (which are known to one of ordinary skill in the art), the Deadtime Comparator modifies the PWM PULSE 305 input signal to the PWM OUT 552 by masking it when prompted by the notification signals signals A 574, A MASK 574 and A MCE 576. The value of signal A 574 controls the binary counter 526. When signal A 574 is high, the counting of the deadtime period begins. When the binary counter 526 is full, signal DT LD 554 is generated by Differential Circuit 1 527. A second notification signal, DT CLR 556 is also generated as a by product of DT LD 554. Together, these notification signals DT LD 554 and DT CLR 556 indicate the end of the deadtime period. DT CLR 556 is a reset signal for the next deadtime counting procedure. Signal A MCE 576 depicts the edges of A Mask 576. The value A Mask 576 indicates whether a critical point condition is present. A low value indicates normal condition, while a high value indicates that a critical point condition is present. When A Mask 576 is high, the output of latch 525 is selected as zero (i.e., PWM OUTA 552=0). When A Mask 576 is low, PWM PULSE 305 is selected as the output of latch 525 (i.e., PWM OUTA 552 equals PWM PULSE 305). Thus, three components (Deadtime Comparator 550, a Critical Point Sensor 570 and a Differential Circuit 2 590) within the Deadtime Circuit 500 function in combination to modify the output signal, PWM OUT 552, to avoid the out of synchronization condition when the critical point cases (i.e, deadtime duration is nearly equal to or equal to the duration of the PWM PULSE 305) are detected.

Figure 22:
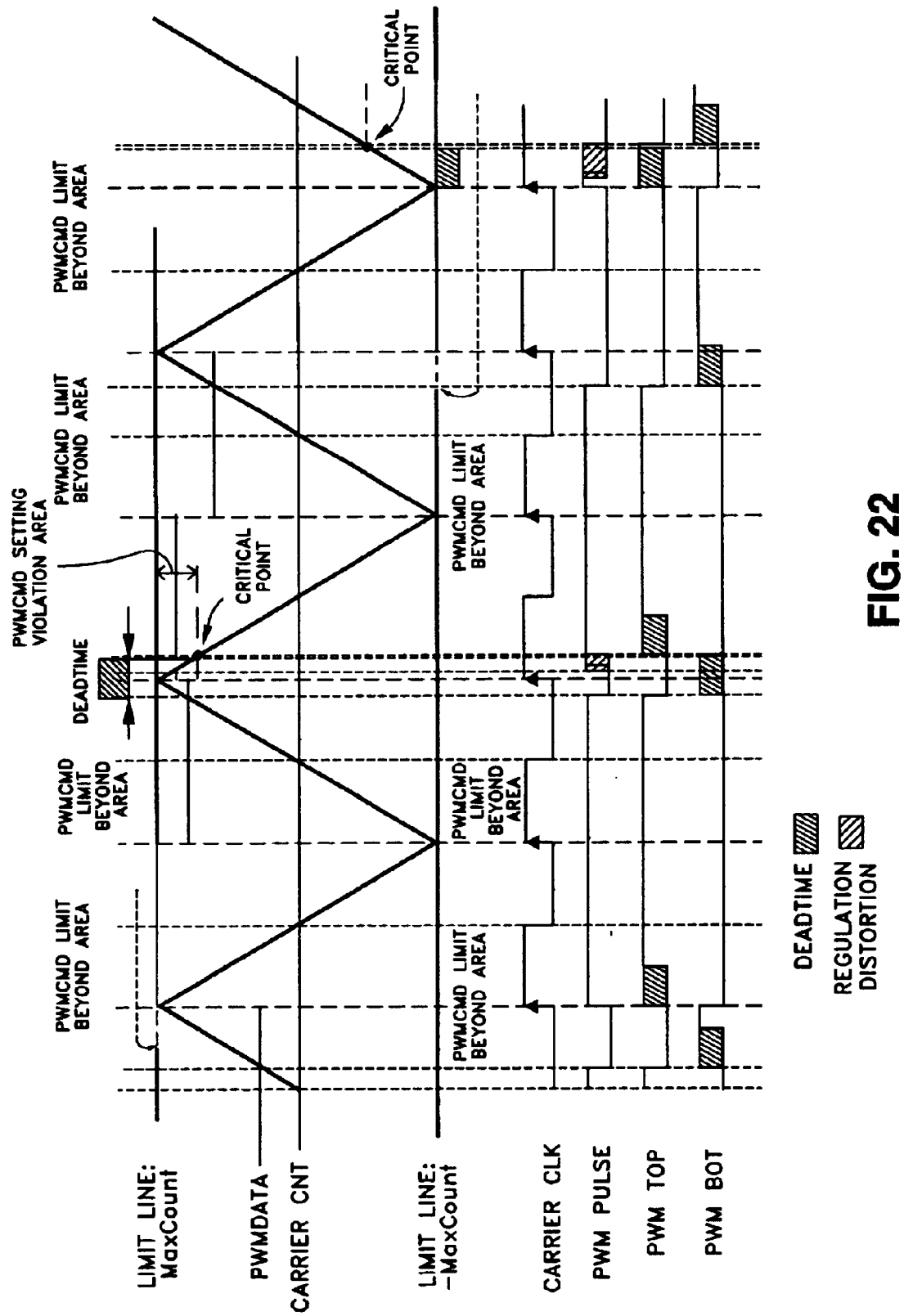
FIG. 22 illustrates the effects of the PWM controller (in accordance with the present invention) on the PWM waveforms.

The PWM OUT 552 and DT LD 554 signals are inputted into the PWM Latch 600. The functionality of the PWM Latch 600 is the same as the Top-Bottom Output Controller 118 of the prior art. Two PWM signals are required to synthesize the two polarities of the desired output AC waveform. Thus, the PWM OUTA 552 signal and its complement signal (/PWM OUTA 553) are separately fed through two separate latches 630, 650 to generate two driving waveforms, PWM TOPA 635 and PWM BOTTOMA 655 to drive separate gate drives 710, 720 inside the inverter 800 which with additional hardware (not shown) will result in the generation of a desired AC waveform. As illustrated in FIG. 22, the present invention PWM Controller 200 masks the out of synchronization condition and reduces the PWM duty cycle loss to prevent compromising the frequency spectrum of the desired AC waveform without requiring complicated software or additional CPU or DSP processing time.

While the present invention has been described in terms of the preferred embodiments, other variations which are within the scope of the invention as defined in the claims will be apparent to those skilled in the art.

What is claimed is:

1. A pulse width modulation controller for inverters comprising:
    a feedback circuit for masking an out of synchronization condition when a deadtime for transitioning between a first gate drive and a second gate drive is greater than a PWM pulse duration, the feedback circuit generating a feedback circuit output signal; and
    a deadtime circuit, coupled to the feedback circuit, for further masking an out of synchronization condition when the deadtime is approximately equal to the PWM pulse duration.

2. A pulse width modulation controller for inverters comprising:
    a feedback circuit for masking an out of synchronization condition when a deadtime for transitioning between a first gate drive and a second gate drive is greater than a PWM pulse duration, the feedback circuit generating a feedback circuit output signal; and
    a deadtime circuit, coupled to the feedback circuit, for further masking an out of synchronization condition when the deadtime is approximately equal to the PWM pulse duration;
    a signal source for generating a modulation signal with a maximum amplitude and a minimum amplitude;
    a carrier range regulation circuit for regulating the maximum and minimum amplitudes, the carrier range regulation circuit generating a carrier range regulation circuit output signal; and
    a selector responsive to the carrier range circuit output signal and the feedback circuit output signal.

3. The pulse width modulation controller of claim 1 wherein the feedback circuit comprises a feedback differential circuit coupled to a sensor circuit for monitoring a feedback circuit input signal.

4. A pulse width modulation controller for inverters comprising:
    a feedback circuit for masking an out of synchronization condition when a deadtime for transitioning between a first gate drive and a second gate drive is greater than a PWM pulse duration, the feedback circuit generating a feedback circuit output signal; and
    a deadtime circuit, coupled to the feedback circuit, for further masking an out of synchronization condition when the deadtime is approximately equal to the PWM pulse duration,
    comprises a deadtime differential circuit, a critical point sensor circuit and a deadtime comparator circuit, wherein the deadtime differential circuit generates a trigger signal for inputting to the critical point sensor circuit, the critical point sensor circuit detects a critical condition based on the trigger signal and generates at least one notification signal for inputting to the deadtime comparator circuit.

5. The pulse width modulation controller of claim 1 further comprising a pulse generator for generating a square wave signal for inputting to the deadtime circuit.

6. The pulse width modulation controller of claim 5 wherein the square wave signal is a variable square wave signal.

7. A pulse width modulation controller for inverters comprising:
    a feedback circuit for masking an out of synchronization condition when a deadtime for transitioning between a first gate drive and a second gate drive is greater than a PWM pulse duration, the feedback circuit generating a feedback circuit output signal; and
    a deadtime circuit, coupled to the feedback circuit, for further masking an out of synchronization condition when the deadtime is approximately equal to the PWM pulse duration,
    a signal source for generating a modulation signal with a maximum amplitude and a minimum amplitude;
    a carrier range regulation circuit for regulating the maximum and minimum amplitudes, the carrier range regulation circuit generating a carrier range regulation circuit output signal, wherein the carrier range regulation circuit comprises an absolute value converter for taking the absolute value of an input converter signal;
    a selector responsive to the carrier range circuit output signal and the feedback circuit output signal;
    a comparator for comparing values of at least two input comparator signals; and
    a selector coupled to the comparator and the absolute value converter, the selector generating a selector output signal.

8. A pulse width modulation controller for inverters comprising:
    a feedback circuit for masking an out of synchronization condition when a deadtime for transitioning between a first sate drive and a second gate drive is greater than a PWM pulse duration, the feedback circuit generating a feedback circuit output signal; and
    a deadtime circuit, coupled to the feedback circuit, for further masking an out of synchronization condition when the deadtime is approximately equal to the PWM pulse duration,
    a signal source for generating a modulation signal with a maximum amplitude and a minimum amplitude;
    a carrier range regulation circuit for regulating the maximum and minimum amplitudes, the carrier range regulation circuit generating a carrier range regulation circuit output signal, wherein the carrier range regulation circuit comprises an absolute value converter for taking the absolute value of an input converter signal;
    a selector responsive to the carrier range circuit output signal and the feedback circuit-output signal;
    a comparator for comparing values of at least two input comparator signals; and
    a selector coupled to the comparator and the absolute value converter, the selector generating a selector output signal,
    wherein the carrier range regulation circuit further comprises a sign assigner circuit for modifying the selector output signal.

9. A DC to AC converter comprising:
a signal source for generating a modulation signal;
an inverter including a first gate drive and a second gate drive;
a feedback circuit for masking an out of synchronization condition when a deadtime for transitioning between the first gate drive and the second gate drive is greater then a PWM pulse duration, the feedback circuit generating a feedback circuit output signal;
a selector responsive to the modulation signal and to the feedback circuit output signal; and
a deadtime circuit, coupled to the feedback circuit, for further masking an out of synchronization condition when the deadtime is approximately equal to the PWM pulse duration, the deadtime circuit generating at least one deadtime circuit output signal for controlling at least one of the first and second gate drives.

10. The DC to AC converter of claim 9 wherein the modulation signal includes a maximum amplitude and a minimum amplitude.

11. The DC to AC converter of claim 10 further comprising a carrier range regulation circuit for regulating the maximum and minimum amplitudes, the carrier range regulation circuit generating a carrier range regulation circuit output signal.

12. The DC to AC converter of claim 9 further comprising a pulse generator for generating a square wave signal for inputting to the deadtime circuit.

13. The DC to AC converter of claim 12 wherein the square wave signal is a variable square wave signal.

14. The DC to AC converter of claim 9 further comprising a PWM latch, coupled to the deadtime circuit, for generating at least one driving waveform to drive the first gate drive.

15. The DC to AC converter of claim 9 further comprising a PWM latch, coupled to the deadtime circuit, for generating at least one driving waveform to drive the second gate drive.

16. A method for protecting an inverter from an out of synchronization condition, the method comprising:
measuring a deadtime period for transitioning between a first gate drive and a second gate drive;
comparing the deadtime period with the duration of a PWM pulse and determining that the deadtime period is greater than the duration of the PWM pulse;
generating a trigger signal to indicate the PWM pulse level changes; and
generating a gating signal based on the trigger signal to mask the PWM pulse.

17. A method for protecting an inverter from an out of synchronization condition, the method comprising:
measuring a deadtime period for transitioning between a first gate drive and a second gate drive;
comparing the deadtime period with the duration of a PWM pulse and determining that the deadtime period is greater than the duration of the PWM pulse;
generating a trigger signal to indicate the PWM pulse level changes; and
generating a gating signal based on the trigger signal to mask the PWM pulse;
generating a sinusoidal modulation signal;
generating a triangular carrier signal; and
comparing a maximum amplitude value of the sinusoidal modulation signal with a maximum peak value of the triangular carrier signal; and
if the maximum amplitude value is greater than the maximum peak value, selecting the maximum peak value as the maximum amplitude value for reducing duty cycle loss.

18. A method for protecting an inverter from an out of synchronization condition, the method comprising:
measuring a deadtime period for transitioning between a first sate drive and a second gate drive;
comparing the deadtime period with the duration of a PWM pulse and determining that the deadtime period is greater than the duration of the PWM pulse;
generating a trigger signal to indicate the PWM pulse level changes;
generating a gating signal based on the trigger signal to mask the PWM pulse;
generating a sinusoidal modulation signal;
generating a triangular carrier signal; and
comparing a minimum amplitude value of the sinusoidal modulation signal with a minimum peak value of the triangular carrier signal; and
if the minimum amplitude value is less than the minimum peak value, selecting the minimum peak value as the minimum amplitude value for reducing duty cycle loss.

19. A method for protecting an inverter from an out of synchronization condition, the method comprising:
sensing a deadtime for transitioning between a first gate drive and a second gate drive;
comparing the deadtime with the duration of a PWM pulse and determining that a critical point condition exists when the deadtime is either nearly equal to or equal to the duration of the PWM pulse;
generating a notification signal that a critical point condition exists; and
generating a zero value signal, based on the notification signal, to a load.

20. The method of claim 19 wherein the deadtime is near equal to the duration of the PWM pulse.

21. The method of claim 19 wherein the deadtime is equal to the duration of the PWM pulse.

22. The method of claim 19 wherein the load is a DC to AC inverter.

23. A method for protecting an inverter from an out of synchronization condition, the method comprising:
sensing a deadtime for transitioning between a first gate drive and a second gate comparing the deadtime with the duration of a PWM pulse and determining that a critical point condition exists when the deadtime is either nearly equal to or equal to the duration of the PWM pulse;
generating a notification signal that a critical point condition exists;
generating a zero value signal, based on the notification signal, to a load;
generating a sinusoidal modulation signal;
generating a triangular carrier signal; and
comparing a maximum amplitude value of the sinusoidal modulation signal with a maximum peak value of the triangular carrier signal, and wherein if the maximum amplitude value is greater than the maximum peak value, the maximum peak value is selected as the maximum amplitude value for reducing duty cycle loss.

24. A method for protecting an inverter from an out of synchronization condition, the method comprising:
sensing a deadtime for transitioning between a first gate drive and a second gate drive;
comparing the deadtime with the duration of a PWM pulse and determining that a critical point condition exists when the deadtime is either nearly equal to or equal to the duration of the PWM pulse;

generating a notification signal that a critical point condition exists;

generating a zero value signal, based on the notification signal, to a load;

generating a sinusoidal modulation signal;

generating a triangular carrier signal; and comparing a minimum amplitude value of the sinusoidal modulation signal with a minimum peak value of the triangular carrier signal, and wherein if the minimum amplitude value is less than the minimum peak value, the minimum peak value is selected as the minimum amplitude value for reducing duty cycle loss.

25. A pulse width modulation controller for masking a critical out of synchronization condition having a first gate drive and a second gate drive, comprising:

a deadtime circuit for generating at least one deadtime circuit output signal for controlling at least one of the first and second gate drives, wherein the deadtime circuit comprises a deadtime differential circuit, a critical point sensor circuit and a deadtime comparator circuit, whereby the deadtime differential circuit generates a trigger signal for inputting to the critical point sensor circuit, the critical point sensor circuit detects the critical out of synchronization condition based on the trigger signal and generates at least one notification signal for inputting to the deadtime comparator circuit.

26. A pulse width modulation controller for masking a critical out of synchronization condition having a first gate drive and a second gate drive, comprising:

a deadtime circuit for generating at least one deadtime circuit output signal for controlling at least one of the first and second gate drives;

a pulse generator for generating a square wave signal for inputting to the deadtime circuit;

a signal source for generating a modulation signal with a maximum amplitude and a minimum amplitude;

a carrier range regulation circuit for regulating the maximum and minimum amplitudes, the carrier range regulation circuit generating a carrier range regulation circuit output signal, wherein the carrier range regulation circuit comprises an absolute value converter for taking the absolute value of an input converter signal;

a comparator for comparing values of at least two input comparator signals; and a selector coupled to the comparator and the absolute value converter, the selector generating a selector output signal.

27. A pulse width modulation controller for masking a critical out of synchronization condition having a first gate drive and a second gate drive, comprising:

a deadtime circuit for generating at least one deadtime circuit output signal for controlling at least one of the first and second gate drives;

a pulse generator for generating a square wave signal for inputting to the deadtime circuit;

a signal source for generating a modulation signal with a maximum amplitude and a minimum amplitude; and a carrier range regulation circuit for regulating the maximum and minimum amplitudes, the carrier range regulation circuit generating a carrier range regulation circuit output signal, wherein the carrier range regulation circuit comprises an absolute value converter for taking the absolute value of an input converter signal;

a comparator for comparing values of at least two input comparator signals; and a selector coupled to the comparator and the absolute value converter, the selector generating a selector output signal, wherein the carrier range regulation circuit further comprises a sign assigner circuit for modifying the selector output signal.

* * * * *

UNITED STATES PATENT AND TRADEMARK OFFICE
CERTIFICATE OF CORRECTION

PATENT NO. : 6,775,158 B2  Page 1 of 1
DATED : August 10, 2004
INVENTOR(S) : Hongdan Fu It is certified that error appears in the above-identified patent and that said Letters Patent is hereby corrected as shown below:

Column 6,
Line 44, "one or ordinary skill" should read -- one of ordinary skill --.

Column 7,
Line 44, "295output" should read -- "295 output --.

Column 8,
Lines 30 and 36, "A 574," should read -- A 572, --.
Lines 37 and 38, "A 574" should read -- A 572 --.
Line 46, "A Mask 576" (both occurrences) should read -- A Mask 574 --
Lines 49 and 51, "A Mask 576" should read -- A Mask 574 --.

Column 6,
Line 64, "comprises" should read -- wherein the deadtime circuit comprises --.

Column 10,
Line 42, "first sate drive" should read -- first gate drive --.

Column 12,
Line 6, "first sate drive" should read -- first gate drive --.
Line 44, "a second gate comprising the deadtime" should read -- a second gate drive; comparing the deadtime --.

Signed and Sealed this

Fourteenth Day of December, 2004

JON W. DUDAS
*Director of the United States Patent and Trademark Office*